US009733458B2

United States Patent
Georgiev et al.

(10) Patent No.: US 9,733,458 B2
(45) Date of Patent: *Aug. 15, 2017

(54) MULTI-CAMERA SYSTEM USING FOLDED OPTICS FREE FROM PARALLAX ARTIFACTS

(71) Applicant: QUALCOMM Incorporated, San Diego, CA (US)

(72) Inventors: Todor Georgiev Georgiev, Sunnyvale, CA (US); Thomas Wesley Osborne, San Diego, CA (US); Sergiu Radu Goma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/163,091

(22) Filed: May 24, 2016

(65) Prior Publication Data

US 2016/0286121 A1 Sep. 29, 2016

Related U.S. Application Data

(63) Continuation of application No. 14/611,045, filed on Jan. 30, 2015, now Pat. No. 9,386,222.
(Continued)

(51) Int. Cl.
*H04N 5/225* (2006.01)
*G02B 17/02* (2006.01)
(Continued)

(52) U.S. Cl.
CPC ....... *G02B 17/023* (2013.01); *G02B 27/1066* (2013.01); *G02B 27/40* (2013.01);
(Continued)

(58) Field of Classification Search
CPC .. H04N 5/23238; H04N 5/247; H04N 5/3415; H04N 3/1593; G03B 37/00; G03B 37/04
(Continued)

(56) References Cited

U.S. PATENT DOCUMENTS 3,698,803 A 10/1972 Toshio
4,114,171 A 9/1978 Altman
(Continued)

FOREIGN PATENT DOCUMENTS

CN 101201459 A 6/2008
CN 101581828 A 11/2009
(Continued)

OTHER PUBLICATIONS

Arican, et al., "Intermediate View Generation for Perceived Depth Adjustment of Sterio Video", Mitsubishi Electric Research Laboratories, http://www.merl.com, TR2009-052, Sep. 2009; 12 pages.
(Continued)

*Primary Examiner* — Kelly L Jerabek
(74) *Attorney, Agent, or Firm* — Knobbe, Martens, Olson & Bear, LLP

(57) ABSTRACT

Aspects relate to an array camera exhibiting little or no parallax artifacts in captured images. For example, the planes of the central mirror surfaces of the array camera can be located at a midpoint along, and orthogonally to, a line between the corresponding camera location and the virtual camera location. Accordingly, the cones of all of the cameras in the array appear as if coming from the virtual camera location after folding by the mirrors. Each sensor in the array "sees" a portion of the image scene using a corresponding facet of the central mirror prism, and accordingly each individual sensor/mirror pair represents only a sub-aperture
(Continued)

of the total array camera. The complete array camera has a synthetic aperture generated based on the sum of all individual aperture rays.

20 Claims, 12 Drawing Sheets

Related U.S. Application Data

(60) Provisional application No. 62/015,316, filed on Jun. 20, 2014.

(51) Int. Cl.
    *G03B 17/00* (2006.01)
    *H04N 13/00* (2006.01)
    *G03B 17/17* (2006.01)
    *G02B 27/10* (2006.01)
    *G02B 27/40* (2006.01)
    *H04N 5/247* (2006.01)
    *G06T 3/40* (2006.01)
    *H04N 5/232* (2006.01)
    *H04N 5/262* (2006.01)
    *H04N 7/00* (2011.01)
    *H04N 13/02* (2006.01)
    *H04N 5/235* (2006.01)

(52) U.S. Cl.
    CPC .............. *G03B 17/00* (2013.01); *G03B 17/17* (2013.01); *G06T 3/4038* (2013.01); *H04N 5/2253* (2013.01); *H04N 5/2254* (2013.01); *H04N 5/2258* (2013.01); *H04N 5/23238* (2013.01); *H04N 5/247* (2013.01); *H04N 13/00* (2013.01); *H04N 5/2355* (2013.01); *H04N 13/0242* (2013.01)

(58) Field of Classification Search
    USPC ........... 348/36, 38–39, 143, 218.1, 239, 262
    See application file for complete search history.

(56) References Cited

U.S. PATENT DOCUMENTS

| | | |
|---|---|---|
| 4,437,745 A | 3/1984 | Hajnal |
| 4,639,586 A | 1/1987 | Fender et al. |
| 4,740,780 A | 4/1988 | Brown et al. |
| 4,751,570 A | 6/1988 | Robinson |
| 5,012,273 A | 4/1991 | Nakamura et al. |
| 5,016,109 A | 5/1991 | Gaylord |
| 5,063,441 A | 11/1991 | Lipton et al. |
| 5,142,357 A | 8/1992 | Lipton et al. |
| 5,194,959 A | 3/1993 | Kaneko et al. |
| 5,207,000 A | 5/1993 | Chang et al. |
| 5,231,461 A | 7/1993 | Silvergate et al. |
| 5,243,413 A | 9/1993 | Gitlin et al. |
| 5,313,542 A | 5/1994 | Castonguay |
| 5,475,617 A | 12/1995 | Castonguay |
| 5,539,483 A | 7/1996 | Nalwa |
| 5,606,627 A | 2/1997 | Kuo |
| 5,614,941 A | 3/1997 | Hines |
| 5,640,222 A | 6/1997 | Paul |
| 5,642,299 A | 6/1997 | Hardin et al. |
| 5,686,960 A | 11/1997 | Sussman et al. |
| 5,721,585 A | 2/1998 | Keast et al. |
| 5,734,507 A | 3/1998 | Harvey |
| 5,745,305 A | 4/1998 | Nalwa |
| 5,760,846 A | 6/1998 | Lee |
| 5,793,527 A | 8/1998 | Nalwa |
| 5,903,306 A | 5/1999 | Heckendorn et al. |
| 5,926,411 A | 7/1999 | Russell |
| 5,990,934 A | 11/1999 | Nalwa |
| 6,111,702 A | 8/2000 | Nalwa |
| 6,115,176 A | 9/2000 | Nalwa |
| 6,128,143 A | 10/2000 | Nalwa |
| 6,141,034 A | 10/2000 | McCutchen |
| 6,141,145 A | 10/2000 | Nalwa |
| 6,144,501 A | 11/2000 | Nalwa |
| 6,195,204 B1 | 2/2001 | Nalwa |
| 6,219,090 B1 | 4/2001 | Nalwa |
| 6,285,365 B1 | 9/2001 | Nalwa |
| 6,356,397 B1 | 3/2002 | Nalwa |
| 6,421,185 B1 | 7/2002 | Wick et al. |
| 6,611,289 B1 | 8/2003 | Yu et al. |
| 6,628,897 B2 | 9/2003 | Suzuki |
| 6,650,774 B1 | 11/2003 | Szeliski |
| 6,700,711 B2 | 3/2004 | Nalwa |
| 6,701,081 B1 | 3/2004 | Dwyer et al. |
| 6,768,509 B1 | 7/2004 | Bradski et al. |
| 6,775,437 B2 | 8/2004 | Kazarinov et al. |
| 6,782,137 B1 | 8/2004 | Avinash |
| 6,798,406 B1 | 9/2004 | Jones et al. |
| 6,809,887 B1 | 10/2004 | Gao et al. |
| 6,850,279 B1 | 2/2005 | Scherling |
| 6,855,111 B2 | 2/2005 | Yokoi et al. |
| 6,861,633 B2 | 3/2005 | Osborn |
| 6,862,364 B1 | 3/2005 | Berestov |
| 6,992,700 B1 | 1/2006 | Sato et al. |
| 7,006,123 B2 | 2/2006 | Yoshikawa et al. |
| 7,039,292 B1 | 5/2006 | Breiholz |
| 7,084,904 B2 | 8/2006 | Liu et al. |
| 7,116,351 B2 | 10/2006 | Yoshikawa |
| 7,215,479 B1 | 5/2007 | Bakin |
| 7,253,394 B2 | 8/2007 | Kang |
| 7,271,803 B2 | 9/2007 | Ejiri et al. |
| 7,336,299 B2 | 2/2008 | Kostrzewski et al. |
| 7,612,953 B2 | 11/2009 | Nagai et al. |
| 7,710,463 B2 | 5/2010 | Foote |
| 7,805,071 B2 | 9/2010 | Mitani |
| 7,817,354 B2 | 10/2010 | Wilson |
| 7,893,957 B2 | 2/2011 | Peters et al. |
| 7,961,398 B2 | 6/2011 | Tocci |
| 7,978,222 B2 | 7/2011 | Schneider |
| 8,004,557 B2 | 8/2011 | Pan |
| 8,098,276 B2 | 1/2012 | Chang et al. |
| 8,115,813 B2 | 2/2012 | Tang |
| 8,139,125 B2 | 3/2012 | Scherling |
| 8,228,417 B1 | 7/2012 | Georgiev et al. |
| 8,267,601 B2 | 9/2012 | Campbell et al. |
| 8,284,263 B2 | 10/2012 | Oohara et al. |
| 8,294,073 B1 | 10/2012 | Vance et al. |
| 8,356,035 B1 | 1/2013 | Baluja et al. |
| 8,400,555 B1 | 3/2013 | Georgiev et al. |
| 8,442,392 B2 | 5/2013 | Ollila et al. |
| 8,482,813 B2 | 7/2013 | Kawano et al. |
| 8,791,984 B2 | 7/2014 | Jones et al. |
| 8,928,988 B1 | 1/2015 | Ford et al. |
| 8,988,564 B2 | 3/2015 | Webster et al. |
| 9,049,375 B2 | 6/2015 | Wade et al. |
| 9,055,208 B2 | 6/2015 | Kim |
| 9,185,296 B2 | 11/2015 | Wade et al. |
| 9,264,610 B2 | 2/2016 | Duparre |
| 9,316,810 B2 | 4/2016 | Mercado |
| 9,332,188 B2 | 5/2016 | Takei et al. |
| 2001/0028482 A1 | 10/2001 | Nishioka |
| 2002/0070365 A1 | 6/2002 | Karellas |
| 2002/0136150 A1 | 9/2002 | Mihara et al. |
| 2003/0024987 A1 | 2/2003 | Zhu |
| 2003/0034395 A1 | 2/2003 | Tsikos et al. |
| 2003/0038814 A1 | 2/2003 | Blume |
| 2003/0214575 A1 | 11/2003 | Yoshikawa |
| 2004/0021767 A1 | 2/2004 | Endo et al. |
| 2004/0051805 A1 | 3/2004 | Yoshikawa et al. |
| 2004/0066449 A1 | 4/2004 | Givon |
| 2004/0105025 A1 | 6/2004 | Scherling |
| 2004/0183907 A1 | 9/2004 | Hovanky et al. |
| 2004/0195492 A1 | 10/2004 | Hsin |
| 2004/0246333 A1 | 12/2004 | Steuart et al. |
| 2004/0263611 A1 | 12/2004 | Cutler |
| 2005/0053274 A1 | 3/2005 | Mayer et al. |
| 2005/0057659 A1 | 3/2005 | Hasegawa |
| 2005/0081629 A1 | 4/2005 | Hoshal |

(56) References Cited

U.S. PATENT DOCUMENTS

| | | |
|---|---|---|
| 2005/0111106 A1 | 5/2005 | Matsumoto et al. |
| 2005/0185711 A1 | 8/2005 | Pfister et al. |
| 2005/0218297 A1 | 10/2005 | Suda et al. |
| 2006/0023074 A1 | 2/2006 | Cutler |
| 2006/0023106 A1 | 2/2006 | Yee et al. |
| 2006/0023278 A1 | 2/2006 | Nishioka |
| 2006/0061660 A1 | 3/2006 | Brackmann |
| 2006/0098267 A1 | 5/2006 | Togawa |
| 2006/0140446 A1 | 6/2006 | Luo et al. |
| 2006/0193509 A1 | 8/2006 | Criminisi et al. |
| 2006/0215054 A1 | 9/2006 | Liang et al. |
| 2006/0215903 A1 | 9/2006 | Nishiyama |
| 2006/0238441 A1 | 10/2006 | Benjamin et al. |
| 2007/0024739 A1 | 2/2007 | Konno |
| 2007/0058961 A1 | 3/2007 | Kobayashi et al. |
| 2007/0064142 A1 | 3/2007 | Misawa et al. |
| 2007/0085903 A1 | 4/2007 | Zhang |
| 2007/0164202 A1 | 7/2007 | Wurz et al. |
| 2007/0216796 A1 | 9/2007 | Lenel et al. |
| 2007/0242152 A1 | 10/2007 | Chen |
| 2007/0263115 A1 | 11/2007 | Horidan et al. |
| 2007/0268983 A1 | 11/2007 | Elam |
| 2008/0029708 A1 | 2/2008 | Olsen et al. |
| 2008/0030597 A1 | 2/2008 | Olsen et al. |
| 2008/0058629 A1 | 3/2008 | Seibel et al. |
| 2008/0088702 A1 | 4/2008 | Linsenmaier et al. |
| 2008/0117289 A1 | 5/2008 | Schowengerdt et al. |
| 2008/0117532 A1 | 5/2008 | Shafer |
| 2008/0218612 A1 | 9/2008 | Border et al. |
| 2008/0259172 A1 | 10/2008 | Tamaru |
| 2008/0266404 A1 | 10/2008 | Sato |
| 2008/0290435 A1 | 11/2008 | Oliver et al. |
| 2008/0291543 A1 | 11/2008 | Nomura et al. |
| 2008/0297612 A1 | 12/2008 | Yoshikawa |
| 2008/0316301 A1 | 12/2008 | Givon |
| 2009/0003646 A1 | 1/2009 | Au et al. |
| 2009/0005112 A1 | 1/2009 | Sorek et al. |
| 2009/0015812 A1 | 1/2009 | Schultz et al. |
| 2009/0051804 A1 | 2/2009 | Nomura et al. |
| 2009/0080695 A1 | 3/2009 | Yang |
| 2009/0085846 A1 | 4/2009 | Cho et al. |
| 2009/0096994 A1 | 4/2009 | Smits |
| 2009/0153726 A1 | 6/2009 | Lim |
| 2009/0160931 A1 | 6/2009 | Pockett et al. |
| 2009/0219402 A1 | 9/2009 | Schneider |
| 2009/0268983 A1 | 10/2009 | Stone et al. |
| 2009/0268985 A1 | 10/2009 | Wong et al. |
| 2009/0296984 A1 | 12/2009 | Nijim et al. |
| 2009/0315808 A1 | 12/2009 | Ishii |
| 2010/0044555 A1 | 2/2010 | Ohara et al. |
| 2010/0045774 A1 | 2/2010 | Len et al. |
| 2010/0066812 A1 | 3/2010 | Kajihara et al. |
| 2010/0165155 A1 | 7/2010 | Chang |
| 2010/0202766 A1 | 8/2010 | Takizawa et al. |
| 2010/0215249 A1 | 8/2010 | Heitz et al. |
| 2010/0232681 A1 | 9/2010 | Fujieda et al. |
| 2010/0259655 A1 | 10/2010 | Takayama |
| 2010/0265363 A1 | 10/2010 | Kim |
| 2010/0278423 A1 | 11/2010 | Itoh et al. |
| 2010/0289878 A1 | 11/2010 | Sato et al. |
| 2010/0290703 A1 | 11/2010 | Sim et al. |
| 2010/0290769 A1 | 11/2010 | Nasiri et al. |
| 2010/0302396 A1 | 12/2010 | Golub et al. |
| 2010/0309286 A1 | 12/2010 | Chen et al. |
| 2010/0309333 A1 | 12/2010 | Smith et al. |
| 2011/0001789 A1 | 1/2011 | Wilson et al. |
| 2011/0007135 A1 | 1/2011 | Okada et al. |
| 2011/0009163 A1 | 1/2011 | Fletcher et al. |
| 2011/0012998 A1 | 1/2011 | Pan |
| 2011/0043623 A1 | 2/2011 | Fukuta et al. |
| 2011/0090575 A1 | 4/2011 | Mori |
| 2011/0096089 A1 | 4/2011 | Shenhav et al. |
| 2011/0096988 A1 | 4/2011 | Suen et al. |
| 2011/0128412 A1 | 6/2011 | Milnes et al. |
| 2011/0150442 A1 | 6/2011 | Ollila et al. |
| 2011/0181588 A1 | 7/2011 | Barenbrug et al. |
| 2011/0213664 A1 | 9/2011 | Osterhout et al. |
| 2011/0235899 A1 | 9/2011 | Tanaka |
| 2011/0249341 A1 | 10/2011 | DiFrancesco et al. |
| 2011/0262122 A1 | 10/2011 | Minamisawa et al. |
| 2011/0304764 A1 | 12/2011 | Shigemitsu et al. |
| 2012/0008148 A1 | 1/2012 | Pryce et al. |
| 2012/0033051 A1 | 2/2012 | Atanassov et al. |
| 2012/0044368 A1 | 2/2012 | Lin et al. |
| 2012/0056987 A1 | 3/2012 | Fedoroff |
| 2012/0075168 A1 | 3/2012 | Osterhout et al. |
| 2012/0229688 A1 | 9/2012 | Tajiri |
| 2012/0249750 A1 | 10/2012 | Izzat et al. |
| 2012/0249815 A1 | 10/2012 | Bohn et al. |
| 2012/0269400 A1 | 10/2012 | Heyward |
| 2012/0281072 A1 | 11/2012 | Georgiev et al. |
| 2012/0293607 A1 | 11/2012 | Bhogal et al. |
| 2012/0293632 A1 | 11/2012 | Yukich |
| 2012/0327195 A1 | 12/2012 | Cheng |
| 2013/0003140 A1 | 1/2013 | Keniston et al. |
| 2013/0010084 A1 | 1/2013 | Hatano |
| 2013/0038689 A1 | 2/2013 | McDowall |
| 2013/0070055 A1 | 3/2013 | Atanassov et al. |
| 2013/0076924 A1 | 3/2013 | Wade et al. |
| 2013/0077945 A1 | 3/2013 | Liu et al. |
| 2013/0100304 A1 | 4/2013 | Wade et al. |
| 2013/0128030 A1 | 5/2013 | Georgiev |
| 2013/0141802 A1 | 6/2013 | Yang |
| 2013/0182325 A1 | 7/2013 | Minamisawa et al. |
| 2013/0222556 A1 | 8/2013 | Shimada |
| 2013/0229529 A1 | 9/2013 | Lablans |
| 2013/0250045 A1 | 9/2013 | Ki et al. |
| 2013/0250053 A1 | 9/2013 | Levy |
| 2013/0250123 A1 | 9/2013 | Zhang et al. |
| 2013/0260823 A1 | 10/2013 | Shukla et al. |
| 2013/0278785 A1 | 10/2013 | Nomura et al. |
| 2013/0286451 A1 | 10/2013 | Verhaegh |
| 2013/0335598 A1 | 12/2013 | Gustavsson et al. |
| 2013/0335600 A1 | 12/2013 | Gustavsson et al. |
| 2014/0009631 A1 | 1/2014 | Topliss |
| 2014/0016832 A1 | 1/2014 | Kong et al. |
| 2014/0085502 A1 | 3/2014 | Lin et al. |
| 2014/0104378 A1 | 4/2014 | Kauff et al. |
| 2014/0111650 A1 | 4/2014 | Georgiev et al. |
| 2014/0139623 A1 | 5/2014 | McCain et al. |
| 2014/0139693 A1 | 5/2014 | Takei et al. |
| 2014/0152852 A1 | 6/2014 | Ito et al. |
| 2014/0184749 A1 | 7/2014 | Hilliges et al. |
| 2014/0192253 A1 | 7/2014 | Laroia |
| 2014/0285673 A1 | 9/2014 | Hundley et al. |
| 2015/0043076 A1 | 2/2015 | Nakayama |
| 2015/0049172 A1 | 2/2015 | Ramachandra et al. |
| 2015/0070562 A1 | 3/2015 | Nayar et al. |
| 2015/0085363 A1 | 3/2015 | Liu et al. |
| 2015/0125092 A1 | 5/2015 | Zhuo et al. |
| 2015/0177524 A1 | 6/2015 | Webster et al. |
| 2015/0201128 A1 | 7/2015 | Dong |
| 2015/0244934 A1 | 8/2015 | Duparre et al. |
| 2015/0253647 A1 | 9/2015 | Mercado |
| 2015/0286033 A1 | 10/2015 | Osborne |
| 2015/0288865 A1 | 10/2015 | Osborne |
| 2015/0370040 A1 | 12/2015 | Georgiev |
| 2015/0371387 A1 | 12/2015 | Atanassov et al. |
| 2015/0373252 A1 | 12/2015 | Georgiev |
| 2015/0373262 A1 | 12/2015 | Georgiev et al. |
| 2015/0373263 A1 | 12/2015 | Georgiev et al. |
| 2015/0373268 A1 | 12/2015 | Osborne |
| 2015/0373269 A1 | 12/2015 | Osborne |
| 2015/0373279 A1 | 12/2015 | Osborne |
| 2016/0014332 A1 | 1/2016 | De Leon et al. |
| 2016/0085059 A1 | 3/2016 | Mercado |
| 2016/0127641 A1 | 5/2016 | Gove |
| 2016/0127646 A1 | 5/2016 | Osborne |
| 2016/0198087 A1 | 7/2016 | Georgiev et al. |
| 2016/0269602 A1 | 9/2016 | Osborne |
| 2016/0295112 A1 | 10/2016 | Georgiev et al. |
| 2016/0353008 A1 | 12/2016 | Osborne |

(56) References Cited

U.S. PATENT DOCUMENTS

| | | |
|---|---|---|
| 2017/0026570 A1 | 1/2017 | Shepard et al. |
| 2017/0038502 A1 | 2/2017 | Georgiev |
| 2017/0118421 A1 | 4/2017 | Georgiev |

FOREIGN PATENT DOCUMENTS

| | | |
|---|---|---|
| CN | 202405984 U | 8/2012 |
| EP | 0610605 A1 | 8/1994 |
| EP | 0751416 A1 | 1/1997 |
| EP | 1176812 A1 | 1/2002 |
| EP | 1383342 A2 | 1/2004 |
| EP | 1816514 A1 | 8/2007 |
| EP | 1832912 A2 | 9/2007 |
| EP | 2242252 A2 | 10/2010 |
| GB | 2354390 A | 3/2001 |
| GB | 2354391 A | 3/2001 |
| JP | H089424 A | 1/1996 |
| JP | H0847001 A | 2/1996 |
| JP | H08125835 A | 5/1996 |
| JP | 8194274 A | 7/1996 |
| JP | H08242453 A | 9/1996 |
| JP | 2001194114 A | 7/2001 |
| JP | 2003304561 A | 10/2003 |
| JP | 3791847 B1 | 6/2006 |
| JP | 2006279538 A | 10/2006 |
| JP | 2007147457 A | 6/2007 |
| JP | 2007323615 A | 12/2007 |
| JP | 2008009424 A | 1/2008 |
| JP | 2010041381 A | 2/2010 |
| JP | 2010067014 A | 3/2010 |
| JP | 2010128820 A | 6/2010 |
| JP | 2010524279 A | 7/2010 |
| WO | WO-199321560 A1 | 10/1993 |
| WO | WO-199847291 A2 | 10/1998 |
| WO | WO-2006075528 A1 | 7/2006 |
| WO | WO-2007129147 A1 | 11/2007 |
| WO | WO-2008112054 A1 | 9/2008 |
| WO | WO-2009047681 A1 | 4/2009 |
| WO | WO-2009086330 A2 | 7/2009 |
| WO | WO-2010019757 A1 | 2/2010 |
| WO | WO-2012136388 A1 | 10/2012 |
| WO | WO-2012164339 A1 | 12/2012 |
| WO | WO-2013154433 A1 | 10/2013 |
| WO | WO-2014012603 A1 | 1/2014 |
| WO | WO-2014025588 A1 | 2/2014 |

OTHER PUBLICATIONS

Han Y., et al., "Removing Illumination from Image Pair for Stereo Matching", Audio, Language and Image Processing (ICALIP), 2012 International Conference on, IEEE, Jul. 16, 2012, XP032278010, pp. 508-512.

Hao M., et al., "Object Location Technique for Binocular Stereo Vision Based on Scale Invariant Feature Transform Feature Points", SIFT, Journal of Harbin Engineering University, Jun. 2009, vol. 30, No. 6 pp. 649-653.

Hoff, et al., "Surfaces from Stereo: Integrating Feature Matching, Disparity Estimation, and Contour Detection", IEEE Transactions on Pattern Analysis and Machine Intelligence, vol. 11, No. 2, pp. 121-136, Feb. 1989.

International Search Report and Written Opinion—PCT/US2015/033176—ISA/EPO—Dec. 18, 2015.

Kawanishi T., et al., "Generation of High-Resolution Stereo Panoramic Images by Omnidirectional Imaging Sensor Using Hexagonal Pyramidal Mirrors", Patiern Recognition, 1998, Proceedings, Fourteenth International Conference on Brisbane, QLD., Australia Aug. 16-20, 1998, Los Alamitos, CA, USA, IEEE Comput. Soc, US, Jan. 1, 1998 (Jan. 1, 1998), pp. 485-489, vol. 1, XP031098377, ISBN: 978-0-8186-8512-5.

Krotkov E., et al., "Active vision for reliable ranging: Cooperating focus, stereo, and vergence", International Journal of Computer Vision. vol. 11, No. 2, Oct. 1, 1993 (Oct. 1, 1993), pp. 187-203, XP055149875, ISSN: 0920-5691. DOI: 10.1007/BF01469228.

Murphy M., et al., "Lens Drivers Focus on Performance in High-Resolution Camera Modules," Analog Dialogue, Nov. 2006, vol. 40, pp. 1-3.

Narkhede, et al., "Stereoscopic Imaging: A Real-Time, In Depth Look," IEEE Potentials, Feb./Mar. 2004, vol. 23, Issue 1, pp. 38-42.

Partial International Search Report—PCT/US2015/033176—ISA/EPO—Aug. 13, 2015.

Ricoh Imagine Change: "New RICOH THETA Model, Capturing 360-degree Images in One Shot, is on Sale Soon—Spherical Video Function, API and SDK (Beta Version)", News Release, Oct. 28, 2014, 3 pages.

Shuchun Y., et al., "Preprocessing for stereo vision based on LOG filter", Proceedings of 2011 6TH International Forum on Strategic Technology, Aug. 2011, XP055211077, pp. 1074-1077.

Sun W.S., et al., "Single-Lens Camera Based on a Pyramid Prism Array to Capture Four Images," Optical Review, 2013, vol. 20 (2), pp. 145-152.

Tan K-H., et al., "Multiview Panoramic Cameras Using a Pyramid", Omnidirectional Vision, 2002, Proceedings, Third Workshop on 2 Jun. 2, 2002, Piscataway, NJ, USA, IEEE, Jan. 1, 2002 (Jan. 1, 2002), pp. 87-93, XP010611080, ISBN: 978-0-7695-1629-5.

Hua et al., "Design Analysis of a High-Resolution Panoramic Camera Using Conventional Imagers and a Mirror Pyramid," IEEE Transactions on Pattern Analysis and Machine Intelligence; Feb. 2007; 29(2): 356-361.

Meng et al., "Single-shot Specular Surface Reconstruction with Gonio-plenoptic Imaging," 2015 IEEE International Conference on Computer Vision; pp. 3433-3441.

Chowdhury A., et al., "Challenges of Megapixel Camera Module Assembly and Test," Electronic Components and Technology Conference, 2005, pp. 1390-1401.

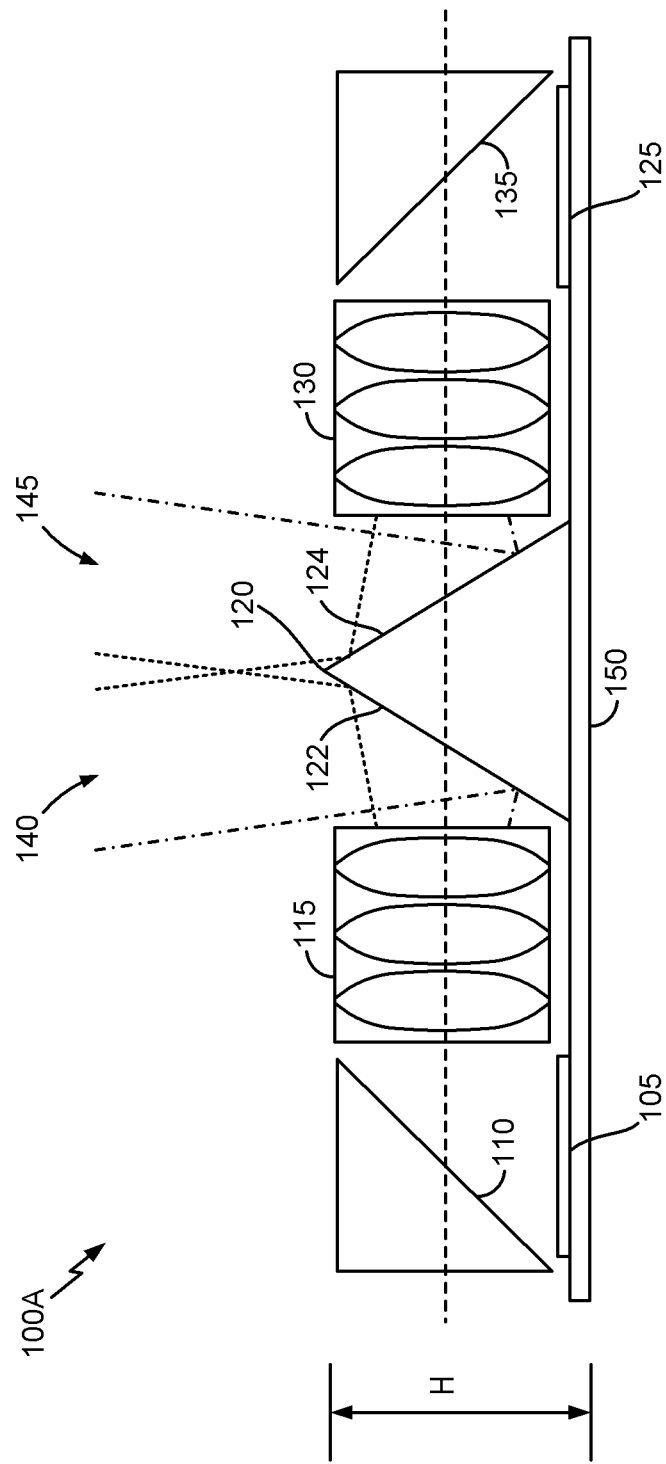

MULTI-CAMERA SYSTEM USING FOLDED OPTICS FREE FROM PARALLAX ARTIFACTS

CROSS REFERENCE TO RELATED APPLICATIONS

The present application is a continuation of U.S. patent application Ser. No. 14/611,045, filed on Jan. 30, 2015, entitled "MULTI-CAMERA SYSTEM USING FOLDED OPTICS FREE FROM PARALLAX ARTIFACTS," which claims the benefit under 35 U.S.C. §119(e) of U.S. Provisional Patent Application No. 62/015,316, filed on Jun. 20, 2014, entitled "MULTI-CAMERA SYSTEM USING FOLDED OPTICS FREE FROM PARALLAX ARTIFACTS," the contents of each of which is hereby incorporated by reference herein in its entirety.

TECHNICAL FIELD

The present disclosure relates to imaging systems and methods that include a multi-camera array. In particular, the disclosure relates to systems and methods that enable low-profile imaging systems of mobile devices while maintaining or improving image quality.

BACKGROUND

Many mobile devices, such as mobile phones and tablet computing devices, include cameras that may be operated by a user to capture still and/or video images. Because the mobile devices are typically designed to be relatively small, it can be important to design the cameras or imaging systems to be as thin as possible in order to maintain a low-profile mobile device. Folded optic image sensor arrays ("array cameras") allow for the creation of low-profile image capture devices without shortening the focal length or decreasing the resolution of the image across the sensor array's field of view. By redirecting light toward each sensor in the array using a primary and secondary surface, and by positioning the lens assemblies used to focus the incoming light between the primary and secondary surfaces, the sensor array may be positioned on a flat substrate perpendicular to the lens assemblies. The longer focal length makes it possible to implement features such as optical zoom and to incorporate more complicated optics that require more space than commonly afforded by the traditional mobile camera, such as adding more optical elements.

Some array cameras employ a central mirror or prism with multiple facets to split incoming light comprising the target image into multiple portions for capture by the sensors in the array, wherein each facet directs a portion of the light from the target image toward a sensor in the array. Each portion of the split light may be passed through a lens assembly and reflected off of an additional surface positioned directly above or below a sensor, such that each sensor captures a portion of the image. The sensor fields of view can overlap to assist in stitching together the captured portions into a complete image.

SUMMARY

The folded optic sensor arrays and image capture techniques described herein allow for the creation of low-profile image capture devices without shortening the focal length or decreasing the resolution of the image across the sensor array's field of view, and the captured images are free (or nearly so) of parallax artifacts. A challenge of array cameras is the quality degradation due to parallax between different views of same object as seen from different cameras of the array. Parallax prevents seamless stitching of the images captured by each camera into a final image completely free of artifacts. Camera views can partially overlap (for example by approximately 20%). Depending on the depth of the scene of in an image (e.g., distance from lens to object(s)) the image from one camera can be shifted relative to the image from another camera. The resulting parallax and tilt can cause "double image" ghosting in the image area corresponding to the overlapping fields of view when the images are stitched or fused together. Even if the array is structured such that there is no overlap in sensor fields of view, parallax results in discontinuous features in the image, such as lines and edges, when such features cross over the borders between sensor fields of view.

The above-described problems, among others, are addressed in various embodiments by the array cameras free of parallax and tilt artifacts as described herein. Some of the embodiments may employ a central mirror or prism, for example with multiple surfaces or facets, to split incoming light comprising the target image into multiple portions for capture by the sensors in the array. The mirror surfaces and sensors can be configured to avoid causing parallax and tilt artifacts in a captured image. For example, the planes of the central mirror surfaces of the array camera can be located at a midpoint along, and orthogonal to, a line between the corresponding camera location and the virtual camera location. Accordingly, the projected field-of-view (FOV) cones of all of the cameras in the array appear as if coming from the virtual camera location after folding of the incoming light by the mirrors.

Each portion of the split light may be passed through a lens assembly and reflected off of an optionally additional reflective surface positioned directly above or below a sensor, such that each sensor captures a portion of the image. In some circumstances, each sensor in the array may capture a portion of the image which overlaps slightly with the portions captured by neighboring sensors in the array, and these portions may be assembled into the target image, for example by linear blending or other image stitching techniques.

One innovation includes a system for capturing a target image of a scene, the system including an array of a plurality of cameras having a virtual center of projection, each of the plurality of cameras configured to capture one of a plurality of portions of a target image of a scene, and each of the plurality of cameras including an image sensor, a lens assembly including at least one lens, the lens assembly having a center of projection, the lens assembly positioned to focus light on the image sensor, the center of projection of the lens assembly located along a line passing through the virtual center of projection, and a mirror located with respect to the lens assembly to provide light to the lens assembly, the mirror further positioned on (or within) a mirror plane, (sometime referred herein as a "mirror plane"), the mirror plane positioned to intersect a point (for example, a midpoint) long the line passing through the virtual center of projection. The mirror plan may be positioned an angle orthogonal to the line. Various embodiments may include additional features.

The following are non-limiting examples of some features and embodiments of such systems. For example, the system may further include a central reflective element (for example, a pyramid-shaped reflective component) including a plurality of primary light re-directing surfaces configured to split light representing the target image of the scene into the plurality of portions, the mirror of each of the plurality of cameras forming one of the primary light folding surfaces. The central reflective element may include an apex formed by an intersection of each of the plurality of primary light re-directing surfaces. An optical axis of each of the plurality of cameras may pass through the apex. The apex and the virtual center of projection are located on a virtual optical axis passing through the apex and the virtual center of projection such that the virtual optical axis forms an optical axis of the array of the plurality of cameras. The system may further include a camera housing comprising at least an upper surface having an aperture positioned to allow light representing the scene to pass through the aperture to the central reflective element. The upper surface may be positioned orthogonal to the virtual optical axis at or above the apex of the central reflective element. The housing may further include a lower surface positioned substantially parallel to the upper surface and positioned at or below a lower surface of the central reflective element. Each of the plurality of cameras may be positioned between the upper surface and the lower surface of the camera housing. The system may further include a processor configured to receive image data comprising an image of a portion of the scene from each of the plurality of cameras and to perform a stitching operation to generate the target image. The system may further (for example, to correct tilt artifacts in the image data) include a processor that is further configured to perform a projective transform on the image data based at least partly a geometric relationship between the virtual center of projection and the center of projection of the lens assembly of each of the plurality of cameras and the location of the mirror for each of the plurality of cameras within a corresponding mirror plane. The system may further include a secondary light re-directing surface associated with each of the plurality of cameras, the secondary light re-directing surface positioned to direct light received from the lens assembly onto the image sensor. The system may further include a substrate having at least one aperture, the at least one aperture positioned to allow light representing the scene to pass through the at least one aperture to the mirror of each of the plurality of cameras, wherein the image sensor for each of the plurality of cameras is positioned on or within the substrate.

Another innovation includes a method of manufacturing an array camera substantially free of parallax artifacts in a captured image. In various embodiments, the method includes positioning a plurality of cameras in an array, each of the plurality of cameras configured to capture one of a plurality of portions of a target image scene, the plurality of cameras positioned to each capture image data from a location of a virtual camera having a virtual center of projection, each of the plurality of cameras including a lens assembly having at least one lens, a camera center of projection having a location determined at least partly by optics of the lens assembly, and a sensor positioned to receive light from the lens assembly. The method may further include providing, for each of the plurality of cameras, a mirror positioned on a mirror plane, the mirror plane positioned to intersect a point (for example, a midpoint) along a line connecting a center of projection of the camera and captured virtual center of projection. The mirror plane may be positioned orthogonally to the line.

The following are non-limiting examples of some features and embodiments of such method. For example, the method may further include providing the mirror for each of the plurality of cameras as a facet of a central reflective element, the plurality of cameras positioned around the central reflective element or reflective component. The method may include providing the central reflective element such that the mirror for each of the plurality of cameras intersects at an apex of the central reflective element. The method may include positioning each of the plurality of cameras such that an optical axis of each of the plurality of cameras intersects with the apex. The method may include providing a secondary light folding surface for each of the plurality of cameras. The method may include positioning the secondary light folding surface between the lens assembly and the sensor to direct light received from the lens assembly onto the sensor. The method may include providing a substrate having at least one aperture positioned to allow light representing the scene to pass through the aperture to the mirror for each of the plurality of cameras. The method may include mounting the sensor for each of the plurality of cameras on or within the substrate such that all sensors are positioned on (or within) the same plane. The method may include providing a processor in electronic communication with the sensor of each of the plurality of cameras, the processor configured to receive the plurality of portions of a target image scene and generate a complete image of the target image scene.

Another innovation includes a method of capturing an image free (or substantially free) of parallax, the method including splitting light representing a scene of the image into a plurality of portions using a plurality of mirrors, directing each of the plurality of portions toward a corresponding one of a plurality of cameras each positioned to capture image data from a location of a virtual camera having a virtual center of projection, each of the plurality of cameras having a lens assembly comprising at least one lens, a camera center of projection having a location determined at least partly by optics of the lens assembly, and a sensor positioned to receive light from the lens assembly, and assembling the plurality of portions into the image, where for each mirror of the plurality of mirrors, the mirror is positioned on a mirror plane. The mirror plane is positioned to intersect a point (for example, a midpoint) along a line connecting the camera center of projection of the corresponding camera of the plurality of cameras and the virtual center of projection. The mirror plane may further be orthogonal to the line.

The following are non-limiting examples of some features and embodiments of such a method. The method may include applying projective transform to captured image data to change an effective tilt of each of the plurality of cameras. The method may include, for each of the plurality of cameras, redirecting the light received from the lens assembly onto the image sensor using a secondary light folding surface.

Another innovation includes an apparatus for capturing a target image of a scene, the apparatus including an array of a plurality of cameras having a virtual center of projection, each of the plurality of cameras configured to capture one of a plurality of portions of the target image of the scene, and for each of the plurality of cameras, means for capturing an image, means for focusing light having a center of projection located along a line passing through the virtual center of projection, and means for redirecting light located at least partially within a primary light folding plane positioned to intersect a midpoint along the line, and at an angle orthogonal to the line.

The following are non-limiting examples of some features and embodiments of such an apparatus. In some embodiments, the light redirecting means includes one of a reflective surface positioned within the primary light folding plane and a refractive prism having a facet positioned within the primary light folding plane. The light focusing means may include a lens assembly including one or more lenses, each of the plurality of cameras may include an additional light folding means positioned to direct light received from the light focusing means onto the image capture means. The apparatus may include means for combining the plurality of portions into the target image. The apparatus may include means for compensating for tilt artifacts between the plurality of portions of the target image.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 1A illustrates a cross-sectional side view of an embodiment of a folded optic sensor assembly.

DETAILED DESCRIPTION

I. Introduction

Implementations disclosed herein provide systems, methods and apparatus for generating images substantially free of parallax artifacts using an array camera with folded optics. Aspects of the present disclosure relate to an array camera exhibiting little or no parallax artifacts in the captured images. For example, the planes of the central mirror surfaces of the array camera can be located at a midpoint along, and orthogonally to, a line between the corresponding camera location and the virtual camera location. Accordingly, the cones of all of the cameras in the array appear as if coming from the virtual camera location after folding by the mirrors. Each sensor in the array "sees" a portion of the image scene using a corresponding facet of the central mirror prism, and accordingly each individual sensor/mirror pair represents only a sub-aperture of the total array camera. The complete array camera has a synthetic aperture generated based on the sum of all individual aperture rays, that is, based on stitching together the images generated by the sub-apertures.

In the following description, specific details are given to provide a thorough understanding of the examples. However, the examples may be practiced without these specific details.

II. Overview of Folded Optic Array Cameras

Figure 1B:
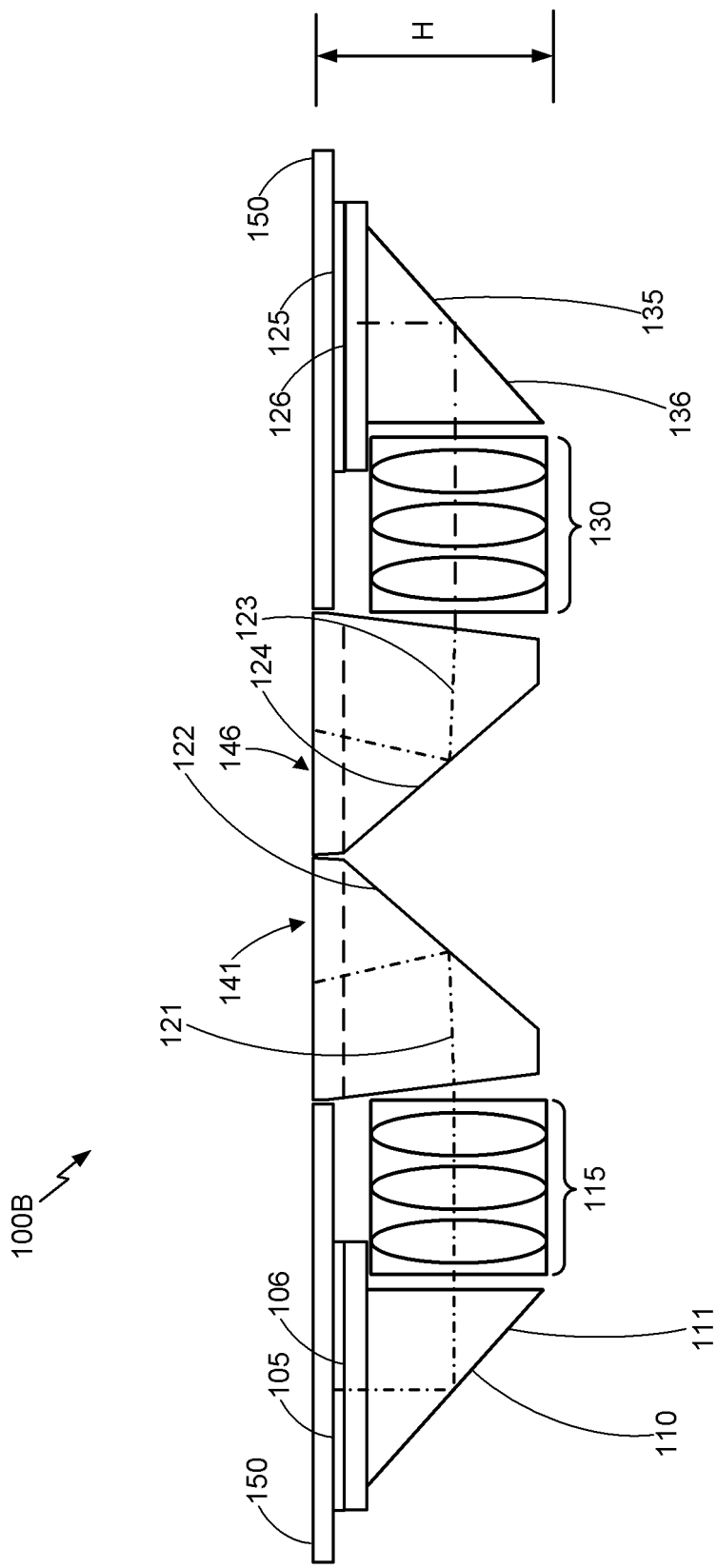
FIG. 1B illustrates a cross-sectional side view of another embodiment of a folded optic sensor assembly.

Referring now to FIGS. 1A and 1B, examples of a folded optic multi-sensor assembly 100A, 100B suitable for use with the autofocus systems and techniques described herein will now be described in greater detail. The term "folded" is a broad term that is used to characterize a type of imaging system (for example, camera) where, for example, light entering the imaging system is re-directed at least once before the light illuminates a sensor in the imaging system. In other words, light that is propagating in one direction as it enters an imaging system is then re-directed or "folded" to propagate in a different direction in in the imaging system or at least before it illuminates a sensor (for example, of the imaging system). FIG. 1A illustrates a cross-sectional side view of an example of a folded optic multi-sensor assembly 100A including image sensors 105, 125, reflective secondary light folding surfaces 110, 135, lens assemblies 115, 130, and a central reflective surface 120 which may all be mounted to a substrate 150. FIG. 1B illustrates a cross-sectional side view of an embodiment of a folded optic multi-sensor assembly including central prisms 141, 146 for primary light re-directing surfaces 122, 124 and additional reflecting surfaces, for example, prisms 111, 136, as illustrated or reflective surfaces, for example a mirrored surface) forming secondary light folding surfaces 135, 110.

Referring to FIG. 1A, the image sensors 105, 125 may comprise, in certain embodiments, a charge-coupled device (CCD), complementary metal oxide semiconductor sensor (CMOS), or any other image sensing device that receives light and generates image data in response to the received image. Each sensor 105, 125 may include a plurality of sensors (or sensor elements) arranged in an array. Image sensors 105, 125 may be configured to generate image data of a single image and/or may be configured to generate image data of a plurality of images (for example, capture video data or a series of single images). Sensors 105 and 125 may be an individual sensor array, or each may represent an array of sensors arrays, for example, a 3×1 array of sensor arrays. However, as will be understood by one skilled in the art, any suitable array of sensors may be used in the disclosed implementations.

The sensors 105, 125 may be mounted on the substrate 150 as shown in FIG. 1A. In some embodiments, all sensors may be on one plane by being mounted to the flat substrate 150. Substrate 150 may be any suitable substantially flat material. The central reflective surface 120 and lens assemblies 115, 130 may be mounted on the substrate 150 as well. Multiple configurations are possible for mounting a sensor array or arrays, a plurality of lens assemblies, and a plurality of primary and secondary reflective or refractive surfaces.

In some embodiments, a central reflective surface 120 may be used to redirect light from a target image scene toward the sensors 105, 125. Central reflective surface 120 may be a mirror or a plurality of mirrors, and may be flat or shaped as needed to properly redirect incoming light to the image sensors 105, 125. For example, in some embodiments, central reflective surface 120 may be a mirror sized and shaped to reflect incoming light rays through the lens assemblies 115, 130 to sensors 105, 125. The central reflective surface 120 may split light comprising the target image into multiple portions and direct each portion at a different sensor. For example, a first side 122 of the central reflective surface 120 (also referred to as a primary light folding surface, as other embodiments may implement a refractive prism rather than a reflective surface) may send a portion of the light corresponding to a first field of view (FOV) 140 toward the left sensor 105 while a second side 124 sends a second portion of the light corresponding to a second FOV 145 toward the right sensor 125. It should be appreciated that together the fields of view 140, 145 of the image sensors cover at least the target image. The present example describes an embodiment comprising two sensors, but other embodiments may have greater than two sensors, for example 2, 3, 4, 8 or more (N) sensors.

In some embodiments in which the receiving sensors are each an array of a plurality of sensors, the central reflective surface may be made of multiple reflective surfaces angled relative to one another in order to send a different portion of the target image scene toward each of the sensors. Each sensor in the array may have a substantially different field of view, and in some embodiments the fields of view may overlap. Certain embodiments of the central reflective surface may have complicated non-planar surfaces to increase the degrees of freedom when designing the lens system. Further, although the central surface is discussed as being a reflective surface, in other embodiments the central surface may be refractive. For example, the central surface may be a prism configured with a plurality of facets, where each facet directs a portion of the light comprising the scene toward one of the sensors.

After being reflected off the central reflective surface 120, at least a portion of incoming light may propagate through each of the lens assemblies 115, 130. One or more lens assemblies 115, 130 may be provided between the central reflective surface 120 and the sensors 105, 125 and reflective surfaces 110, 135. The lens assemblies 115, 130 may be used to focus the portion of the target image which is directed toward each sensor.

In some embodiments, each lens assembly may comprise one or more lenses and an actuator for moving the lens among a plurality of different lens positions through a housing. The actuator may, for example, be a voice coil motor (VCM), micro-electronic mechanical system (MEMS), or a shape memory alloy (SMA). The lens assembly may further comprise a lens driver for controlling the actuator.

In some embodiments, traditional auto focus techniques may be implemented by changing the focal length between the lens 115, 130 and corresponding sensor 105, 125 of each camera. In some embodiments, this may be accomplished by moving a lens barrel. Other embodiments may adjust the focus by moving the central mirror up or down or by adjusting the angle of the mirror relative to the lens assembly. Certain embodiments may adjust the focus by moving the side mirrors over each sensor. Such embodiments may allow the assembly to adjust the focus of each sensor individually. Further, it is possible for some embodiments to change the focus of the entire assembly at once, for example by placing a lens, like a liquid lens, over the entire assembly. In certain implementations, computational photography may be used to change the focal point of the camera array.

Multiple side reflective surfaces, for example, reflective surfaces 110 and 135, can be provided around the central mirror 120 opposite the sensors. After passing through the lens assemblies, the side reflective surfaces 110, 135 (also referred to as a secondary light folding surface, as other embodiments may implement a refractive prism rather than a reflective surface) can reflect the light (downward, as depicted in the orientation of FIG. 1A) onto the sensors 105, 125. As depicted, sensor 105 may be positioned beneath reflective surface 110 and sensor 125 may be positioned beneath reflective surface 135. However, in other embodiments, the sensors may be above the side reflected surfaces 110, 135, and the side reflective surfaces may be configured to reflect light upward (see for example, FIG. 1B). Other suitable configurations of the side reflective surfaces and the sensors are possible in which the light from each lens assembly is redirected toward the sensors. Certain embodiments may enable movement of the side reflective surfaces 110, 135 to change the focus or FOV of the associated sensor.

Each sensor's FOV 140, 145 may be steered into the object space by the surface of the central mirror 120 associated with that sensor. Mechanical methods may be employed to tilt the mirrors and/or move the prisms in the array so that the FOV of each camera can be steered to different locations on the object field. This may be used, for example, to implement a high dynamic range camera, to increase the resolution of the camera system, or to implement a plenoptic camera system. Each sensor's (or each 3×1 array's) FOV may be projected into the object space, and each sensor may capture a partial image comprising a portion of the target scene according to that sensor's field of view. As illustrated in FIG. 1A, in some embodiments, the fields of view 140, 145 for the opposing sensor arrays 105, 125 may overlap by a certain amount. To reduce the overlap and form a single image, a stitching process as described below may be used to combine the images from the two opposing sensor arrays 105, 125. In embodiments with more sensors that illustrated in FIG. 1A, images may be combined from multiple sensors and sensors may not necessarily be opposing, for example, be symmetrically or asymmetrically arranged. Certain embodiments of the stitching process may employ the overlap 150 for identifying common features in stitching the partial images together. After stitching the overlapping images together, the stitched image may be cropped to a desired aspect ratio, for example 4:3 or 1:1, to form the final image. In some embodiments, the alignment of the optical elements relating to each FOV are arranged to minimize the overlap 150 so that the multiple images are formed into a single image with minimal or no image processing required in joining the images.

FIG. 1B illustrates a cross-sectional side view of another embodiment of a folded optic array camera 100B. As shown in FIG. 1B, a sensor assembly 100B includes a pair of image sensors 105, 125 each mounted to substrate 150, lens assemblies 115, 130 corresponding to image sensors 105, 125, respectively, and a secondary light folding surface 110, 135 positioned over the cover glass 106, 126 of image sensors 105, 125, respectively. The primary light folding surface 122 of refractive prism 141 directs a portion of light from the target image scene along optical axis 121 through the lens assembly 115, is redirected off of the secondary light folding surface 110, passes through the cover glass 106, and is incident upon the sensor 105. The primary light folding surface 124 of refractive prism 146 directs a portion of light from the target image scene along optical axis 123 through the lens assembly 130, is redirected off of the secondary light folding surface 135, passes through the cover glass 126, and is incident upon the sensor 125. The folded optic array camera 100B is illustrative of one array camera embodiment implementing refractive prisms instead of the reflective surfaces of the array camera 100A of FIG. 1A. Each of the refractive prisms 141, 146 is provided in an aperture in the substrate 150 such that the primary light directing surfaces 122, 124 are below the plane formed by substrate and receive light representing the target image scene.

The sensors 105, 125 may be mounted on the substrate 150 as shown in FIG. 1B. In some embodiments, all sensors may be on one plane by being mounted to the flat substrate 150. Substrate 150 may be any suitable substantially flat material. The substrate 150 can include an aperture as described above to allow incoming light to pass through the substrate 150 to the primary light folding surfaces 122, 124. Multiple configurations are possible for mounting a sensor array or arrays, as well as the other camera components illustrated, to the substrate 150.

Primary light folding surfaces 122, 124 may be prism surfaces as illustrated, or may be a mirror or a plurality of mirrors, and may be flat or shaped as needed to properly redirect incoming light to the image sensors 105, 125. In some embodiments the primary light folding surfaces 122, 124 may be formed as a central reflective element, as illustrated in FIG. 1A. The central reflective element may be, for example, an arrangement of a plurality of mirrors or reflective surfaces, or a prism. The reflective element may be pyramid-shaped. The central mirror reflective element, prism, or other reflective surface may split light representing the target image into multiple portions and direct each portion at a different sensor. For example, a primary light folding surface 122 may send a portion of the light corresponding to a first FOV toward the left sensor 105 while primary light folding surface 124 sends a second portion of the light corresponding to a second FOV toward the right sensor 125. In some embodiments in which the receiving sensors are each an array of a plurality of sensors, the light folding surfaces may be made of multiple reflective surfaces angled relative to one another in order to send a different portion of the target image scene toward each of the sensors. It should be appreciated that together the fields of view of the cameras cover at least the target image, and can be aligned and stitched together after capture to form a final image captured by the synthetic aperture of the array. Each sensor in the array may have a substantially different field of view, and in some embodiments the fields of view may overlap.

Other embodiments may combine the reflective and refractive elements illustrated by FIGS. 1A and 1B. For example, in some embodiments the primary light folding surface may be reflective while the secondary light folding service is refractive, and vice-versa.

As illustrated by FIGS. 1A and 1B, each array camera has a total height H. In some embodiments, the total height H can be approximately 4.5 mm or less. In other embodiments, the total height H can be approximately 4.0 mm or less. Though not illustrated, the entire array camera 100A, 100B may be provided in a housing having a corresponding interior height of approximately 4.5 mm or less or approximately 4.0 mm or less.

As used herein, the term "camera" refers to an image sensor, lens system, and a number of corresponding light folding surfaces, for example the primary light folding surface 124, lens assembly 130, secondary light folding surface 135, and sensor 125 as illustrated in FIG. 1. A folded-optic multi-sensor array, referred to as an "array" or "array camera," can include a plurality of such cameras in various configurations. Some embodiments of array configurations are disclosed in U.S. Application Pub. No. 2014/0111650, filed Mar. 15, 2013 and titled "MULTI-CAMERA SYSTEM USING FOLDED OPTICS," the disclosure of which is hereby incorporated by reference. Other array camera configurations that would benefit from the autofocus systems and techniques described herein are possible.

Figure 2:
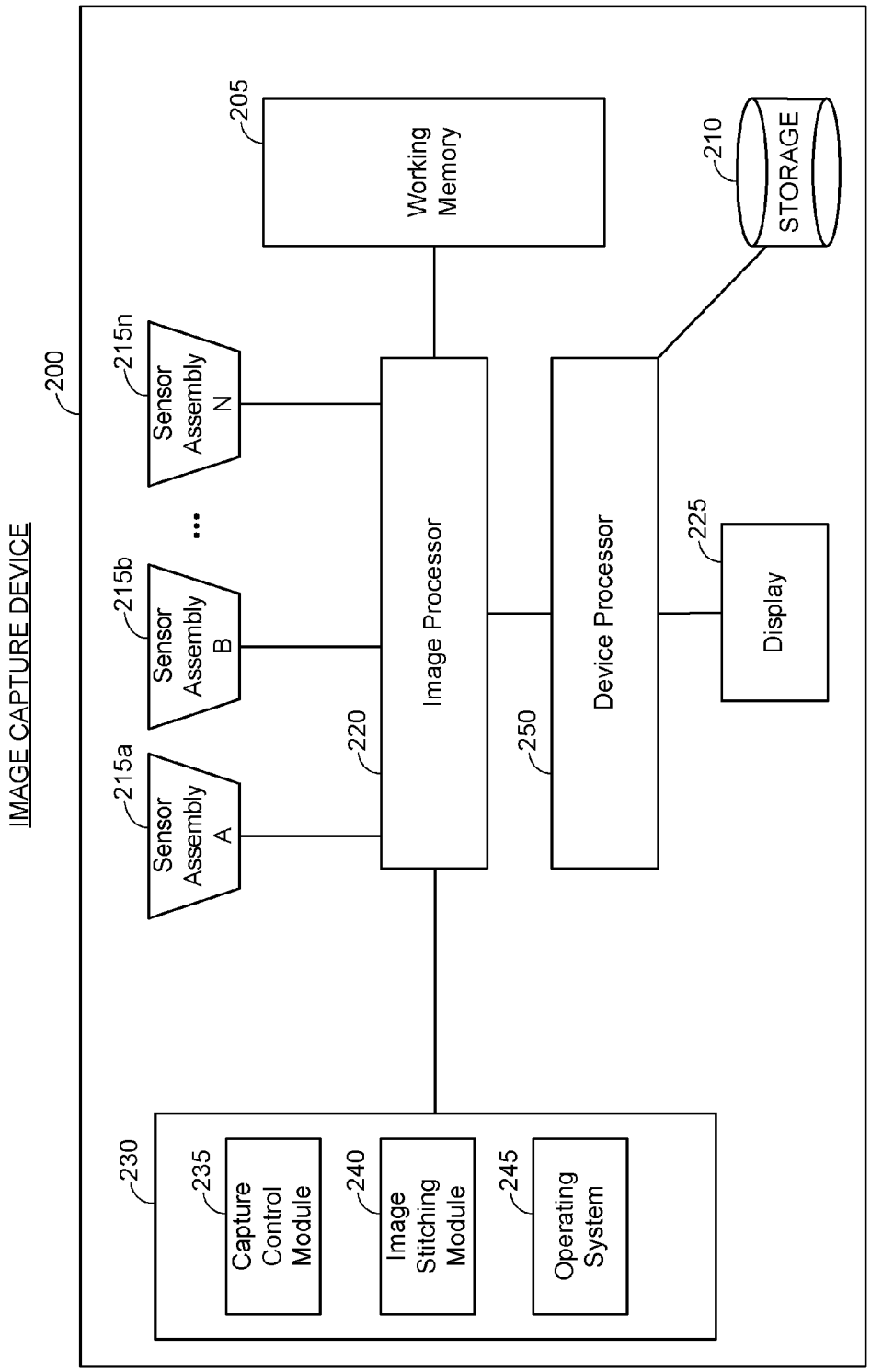
FIG. 2 illustrates a block diagram of one embodiment of an image capture device.

FIG. 2 depicts a high-level block diagram of a device 200 having a set of components including an image processor 220 linked to one or more cameras 215a-n. The image processor 220 is also in communication with a working memory 205, memory component 230, and device processor 250, which in turn is in communication with storage 210 and electronic display 225.

Device 200 may be a cell phone, digital camera, tablet computer, personal digital assistant, or the like. There are many portable computing devices in which a reduced thickness imaging system such as is described herein would provide advantages. Device 200 may also be a stationary computing device or any device in which a thin imaging system would be advantageous. A plurality of applications may be available to the user on device 200. These applications may include traditional photographic and video applications, high dynamic range imaging, panoramic photo and video, or stereoscopic imaging such as 3D images or 3D video.

The image capture device 200 includes the cameras 215a-n for capturing external images. The cameras 215a-n may each comprise a sensor, lens assembly, and a primary and secondary reflective or refractive surface for redirecting a portion of a target image to each sensor, as discussed above with respect to FIG. 1. In general, N cameras 215a-n may be used, where N≥2. Thus, the target image may be split into N portions in which each sensor of the N cameras captures one portion of the target image according to that sensor's field of view. It will be understood that cameras 215a-n may comprise any number of cameras suitable for an implementation of the folded optic imaging device described herein. The number of sensors may be increased to achieve lower z-heights of the system, as discussed in more detail below with respect to FIG. 4, or to meet the needs of other purposes, such as having overlapping fields of view similar to that of a plenoptic camera, which may enable the ability to adjust the focus of the image after post-processing. Other embodiments may have a FOV overlap configuration suitable for high dynamic range cameras enabling the ability to capture two simultaneous images and then merge them together. The cameras 215a-n may be coupled to the image processor 220 to communicate captured images to the working memory 205, the device processor 250, to the electronic display 225 and to the storage (memory) 210.

The image processor 220 may be configured to perform various processing operations on received image data comprising N portions of the target image in order to output a high quality stitched image, as will be described in more detail below. Image processor 220 may be a general purpose processing unit or a processor specially designed for imaging applications. Examples of image processing operations include cropping, scaling (e.g., to a different resolution), image stitching, image format conversion, color interpolation, color processing, image filtering (for example, spatial image filtering), lens artifact or defect correction, etc. Image processor 220 may, in some embodiments, comprise a plurality of processors. Certain embodiments may have a processor dedicated to each image sensor. Image processor 220 may be one or more dedicated image signal processors (ISPs) or a software implementation of a processor.

As shown, the image processor 220 is connected to a memory 230 and a working memory 205. In the illustrated embodiment, the memory 230 stores capture control module 235, image stitching module 240, and operating system 245. These modules include instructions that configure the image processor 220 of device processor 250 to perform various image processing and device management tasks. Working memory 205 may be used by image processor 220 to store a working set of processor instructions contained in the modules of memory component 230. Alternatively, working memory 205 may also be used by image processor 220 to store dynamic data created during the operation of device 200.

As mentioned above, the image processor 220 is configured by several modules stored in the memories. The capture control module 235 may include instructions that configure the image processor 220 to adjust the focus position of cameras 215a-n. Capture control module 235 may further include instructions that control the overall image capture functions of the device 200. For example, capture control module 235 may include instructions that call subroutines to configure the image processor 220 to capture raw image data of a target image scene using the cameras 215a-n. Capture control module 235 may then call the image stitching module 240 to perform a stitching technique on the N partial images captured by the cameras 215a-n and output a stitched and cropped target image to imaging processor 220. Capture control module 235 may also call the image stitching module 240 to perform a stitching operation on raw image data in order to output a preview image of a scene to be captured, and to update the preview image at certain time intervals or when the scene in the raw image data changes.

Image stitching module 240 may comprise instructions that configure the image processor 220 to perform stitching and cropping techniques on captured image data. For example, each of the N sensors 215a-n may capture a partial image comprising a portion of the target image according to each sensor's field of view. The fields of view may share areas of overlap, as described above and below. In order to output a single target image, image stitching module 240 may configure the image processor 220 to combine the multiple N partial images to produce a high-resolution target image. Target image generation may occur through known image stitching techniques.

For instance, image stitching module 240 may include instructions to compare the areas of overlap along the edges of the N partial images for matching features in order to determine rotation and alignment of the N partial images relative to one another. Due to rotation of partial images and/or the shape of the FOV of each sensor, the combined image may form an irregular shape. Therefore, after aligning and combining the N partial images, the image stitching module 240 may call subroutines which configure image processor 220 to crop the combined image to a desired shape and aspect ratio, for example a 4:3 rectangle or 1:1 square. The cropped image may be sent to the device processor 250 for display on the display 225 or for saving in the storage 210.

Operating system module 245 configures the image processor 220 to manage the working memory 205 and the processing resources of device 200. For example, operating system module 245 may include device drivers to manage hardware resources such as the cameras 215a-n. Therefore, in some embodiments, instructions contained in the image processing modules discussed above may not interact with these hardware resources directly, but instead interact through standard subroutines or APIs located in operating system component 270. Instructions within operating system 245 may then interact directly with these hardware components. Operating system module 245 may further configure the image processor 220 to share information with device processor 250.

Device processor 250 may be configured to control the display 225 to display the captured image, or a preview of the captured image, to a user. The display 225 may be external to the imaging device 200 or may be part of the imaging device 200. The display 225 may also be configured to provide a view finder displaying a preview image for a use prior to capturing an image, or may be configured to display a captured image stored in memory or recently captured by the user. The display 225 may comprise an LCD or LED screen, and may implement touch sensitive technologies.

Device processor 250 may write data to storage module 210, for example data representing captured images. While storage module 210 is represented graphically as a traditional disk device, those with skill in the art would understand that the storage module 210 may be configured as any storage media device. For example, the storage module 210 may include a disk drive, such as a floppy disk drive, hard disk drive, optical disk drive or magneto-optical disk drive, or a solid state memory such as a FLASH memory, RAM, ROM, and/or EEPROM. The storage module 210 can also include multiple memory units, and any one of the memory units may be configured to be within the image capture device 200, or may be external to the image capture device 200. For example, the storage module 210 may include a ROM memory containing system program instructions stored within the image capture device 200. The storage module 210 may also include memory cards or high speed memories configured to store captured images which may be removable from the camera.

Although FIG. 2 depicts a device having separate components to include a processor, imaging sensor, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 2 illustrates two memory components, including memory component 230 comprising several modules and a separate memory 205 comprising a working memory, one with skill in the art would recognize several embodiments utilizing different memory architectures. For example, a design may utilize ROM or static RAM memory for the storage of processor instructions implementing the modules contained in memory component 230. The processor instructions may be loaded into RAM to facilitate execution by the image processor 220. For example, working memory 205 may comprise RAM memory, with instructions loaded into working memory 205 before execution by the processor 220.

Figure 3A:
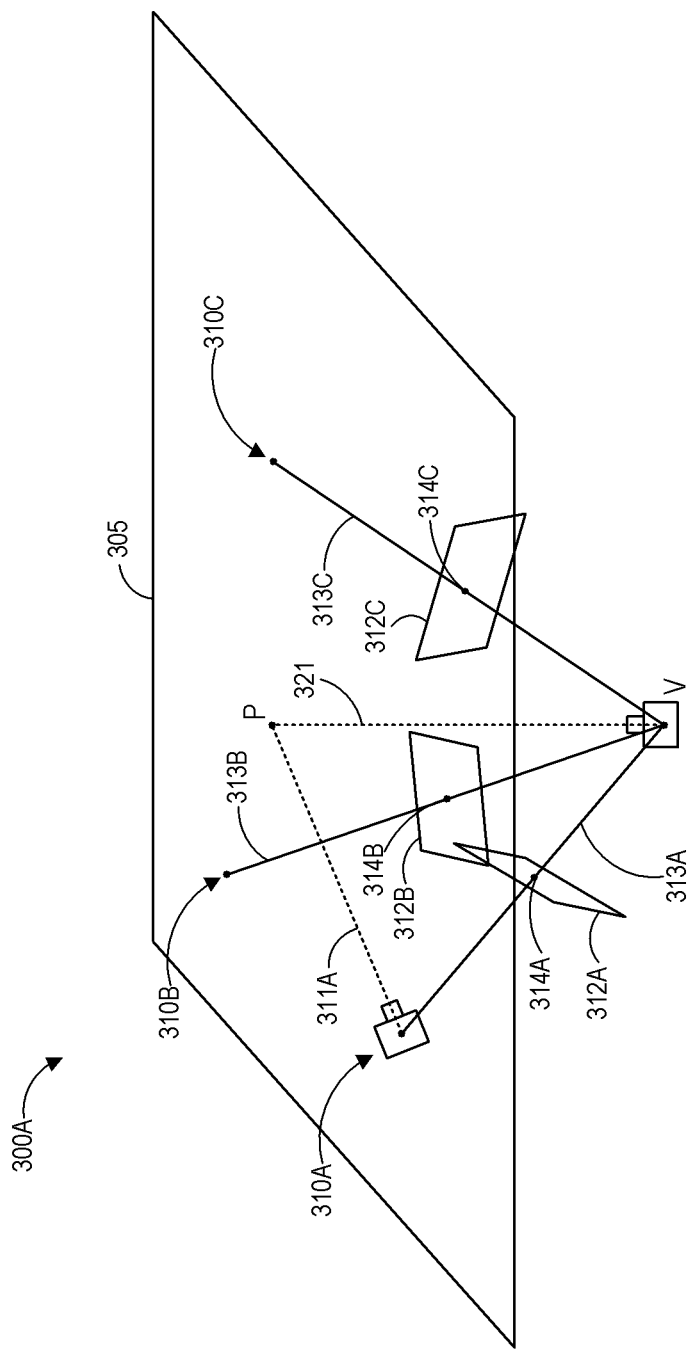
FIGS. 3A and 3B illustrate two embodiments of camera center of projection and mirror plane locations in a parallax free array camera.

III. Overview of Folded Optic Array Cameras Free From Parallax and Tilt Artifacts FIG. 3A is a schematic illustrating camera 310A, 310B, 310C and mirror plane 312A, 312B, 312C locations in a parallax free array camera 300A, according to some embodiments. A sensor of the array and its corresponding lens (and possible additional light folding surface or surfaces) is referred to herein as a "camera," and the cooperation of all cameras in the array is referred to herein as a "virtual camera." In the following description of parallax free array camera design principles, a camera can be modelled as a point, that is a center of projection of its associated lens assembly, which center of projection can be located anywhere in xyz space. An array of cameras is modelled by an array of such centers of projection.

A virtual camera is the location from which an image captured by a camera, for example the image captured by 310A, appears to have been captured if no optical folding (e.g., reflection using mirrors) had been used. In a parallax free array physically formed by multiple folded optic cameras, all virtual cameras are merged into one single virtual camera having the same center of projection, shown in FIGS. 3A and 3B as point V. Each individual camera of the array may have potentially different direction of gaze, that is a direction or alignment of the optical axis of the camera, which is sometimes referred to as tilt. A main point of the spatial relationships described herein for forming parallax free array cameras is that the effective tilt of each virtual camera (for example, the appearance of tilt in the corresponding image) can be changed computationally by application of a projective transform to the captured image data. Stitching the images together after application of proper projective transforms and cropping produces a single image—a composite image of the target scene using data received from the multiple cameras of the array. This single image appears as if it was captured by a single virtual camera with a center of projection at point V, referred to herein as the virtual camera. Accordingly, the virtual camera of the parallax-free arrays as described herein is actually a compound virtual camera and a composition of the multiple virtual cameras merging into a single point. The virtual camera as used herein can also be the result of computational synthesis by transforming, cropping, and stitching the individual images each captured by one of the multiple cameras of the array.

Figure 3B:
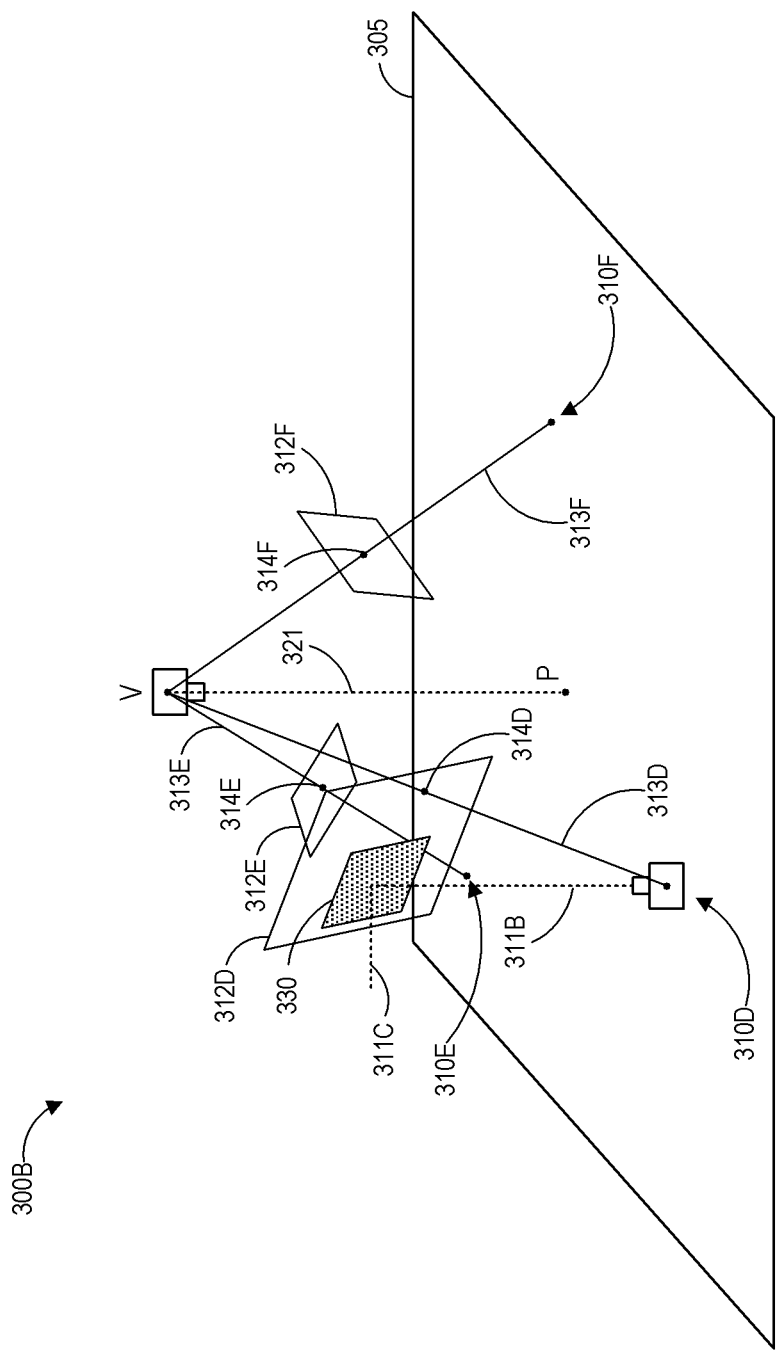

In FIGS. 3A and 3B, the cameras 310B, 310C, 310E, and 310F are each modeled as a point representing the center of projection for that camera in xyz space. For example, a real camera has an entrance pupil having a certain position in space. The center of the pupil is referred to herein as the center of projection of the camera and is determined at least partly by the optics of the lens assembly. The center of projection may not be where the physical aperture of the camera is located due to optics of the lens assembly, and the real position where the optical center of projection is located is where the center of the pupil is located. As a camera rotates about this point—its center of projection—the captured image transforms as with application of a computational projective transform. The schematics illustrated by FIGS. 3A and 3B are an abstraction: the direction of gaze and focal length of a camera are not essential for parallax-free imaging because such aspects can be corrected by projective transform at a later stage (for example, computationally). As such, the abstraction of cameras 310B, 310C, 310E, and 310F are illustrated only by a center of projection in this general treatment. Use of the center of projection for representing the camera serves the purpose of enabling designing of the array of cameras to form parallax free images. Real gaze and focal length of the cameras are important for other aspects of imaging, but the specifics of these aspects can be varied according to the needs of various embodiments of a parallax free array camera.

Virtual camera V and cameras 310A, 310D are illustrated as a block diagram centered on the point representing the center of projection for each of virtual camera V and cameras 310A, 310D, respectively. As illustrated in the embodiment of FIG. 3A, for a thin camera, as described above, the array of cameras are positioned in (or at least approximately positioned in) the horizontal plane 305 of the thin camera. The term "horizontal" is chosen arbitrarily for the purpose of this discussion, for example, in reference to FIGS. 3A and 3B. The mirror planes 312A-312E are illustrated with boundaries, however the planes extend infinitely and the actual mirror locations could be anywhere within the planes represented by 312A-312E. In some embodiments the mirrored surface could connect at angles to form a reflective element having an apex, for example located at or approximately at point P along the optical axis 321 of virtual camera V. The apex could be located at other points along the optical axis 321 of the virtual camera V in other examples. Though discussed primarily in terms of mirror planes and corresponding mirrored surfaces, the planes 312A, 312B, 312C can also be used to position light directing facets of a refractive prism in some embodiments.

FIG. 3A illustrates three cameras 310A, 310B, 310C in the horizontal plane 305 of an array camera and FIG. 3B illustrates three cameras 310D, 310E, 310F in the horizontal plane 305. In shown in the illustrated embodiment, each camera 310A, 310B, 310C in FIG. 3A may be positioned so the center of the FOV is pointing towards (or approximately pointing towards) a central location P as illustrated by the optical axis 311A of camera 310A. In FIG. 3B the cameras 310D, 310E, and 310F are depicted as pointing horizontally towards central location P. Each camera 310D, 310E, 310F can be positioned to be approximately "looking" (as illustrated by optical axis 311B of camera 310D) toward a mirror 330 (illustrated only in reference to camera 310D and mirror plan 312D) positioned in the mirror plane 312D, 312E, 312F corresponding to the camera 310D, 310E, 310F. In other words, each camera 310D, 310E, 310F can have an optical axis of its projected FOV positioned toward a mirror. In both configurations 300A, 300B, the corresponding mirror redirects (or folds) the projected optical axis of each camera 310A-F and accordingly the light (or cone of rays) received by the camera so that all cameras 310A-F optically look (considering the folding of the light) in a direction (or substantially in a direction) along the virtual optical axis 321, normal to the plane 305. In other words, each camera 310A-F may have a central axis of its projected FOV along the virtual optical axis 321 to receive light propagating from a target scene.

However, the direction in which a camera is looking—the alignment of its optical axis—can be a design parameter that may be varied while still complying with the parallax free spatial relationships described herein. There are tradeoffs that will be considered in specific designs, for example the direction of gaze of each camera and the location of each camera's center of projection (for example, its distance from the central point P and), each camera's focal length, number of cameras in the array, and whether the array should be symmetric. This generality of the parallax free design principles of FIGS. 3A and 3B allows for great freedom of design and captures all sorts of array camera configurations. Accordingly, depending on the specific implementation of these parallax free principles, not all light from a mirror positioned in the plane 312A-312F may be incident upon an associated camera 310A-310F, however the benefit of this design is that it provides parallax-free images.

Accordingly, though optical axis 311A of FIG. 3A is illustrated as "looking at" or aligned with point P, the optical axis of a camera is not required to look at point P. The optical axis in other examples can look at any point on the line 321 between P and Z or, in other examples, could look in some other direction. Similarly, optical axis 311B of FIG. 3B, shown pointing approximately at the center mirror 330, can be pointed in other directions, for example at an apex of a mirror reflective element formed by the multiple mirrors of the camera. Cameras in the arrays 300A having an optical axis aligned with point P, as with illustrated axis 311A, can be rotated around their center of projection to look a little bit below point P along line 321 without physically rotating the actual camera, for instance through computation by taking the original image data from the camera, applying a projective transform, and then cropping the image. Such computational rotation can be easily handled digitally (within certain practical limits, for example approximately 10 degrees). The general model for parallax-free imaging described herein therefore considers a camera without any specific direction of view, and example optical axes 311A and 311B are provided just for example.

The parallax-free design principle as illustrated in FIGS. 3A and 3B is configured such that, after reflection from mirrors located somewhere within the mirror planes 312A-312C and 312D-312F all centers of projection of the cameras 310A-310C and 310D-310F appear as being projected from one (or a single) virtual center V.

In the embodiment 300A of FIG. 3A, the virtual camera center of projection V is located below the horizontal plane 305 such that the cameras 310A, 310B, 310C cooperate to capture an image as if looking upward along optical axis 321 into an image space above the horizontal plane 305, where below and upward are terms chosen arbitrarily to refer to the relative positions of the cameras 310A, 310B, 310C, virtual camera center of projection V, and image space, and are not intended to constrain the positioning or orientation of the actual camera in real space. In some examples of real cameras constructed according to the principles illustrated in FIG. 3A, the actual mirrors located within planes 312A, 312B, 312C can intersect to form a reflective element with its apex positioned above its base. For example, the apex can be located at point P and the base of the reflective element can be located somewhere along the optical axis 321 towards the virtual camera V.

The embodiment 300B of FIG. 3B represents a wide FOV array camera. The virtual camera center of projection V is located above the horizontal plane 305 such that the cameras 310D, 310E, 310F cooperate to capture a wide FOV image as if looking outward away from optical axis 321 into an image space around the horizontal plane 305, where below and upward are terms chosen arbitrarily to refer to the relative positions of the cameras 310D, 310E, 310F, virtual camera center of projection V, and image space, and are not intended to constrain the positioning or orientation of the actual camera in real space. In some examples of real cameras constructed according to the principles illustrated in FIG. 3B, the actual mirrors located within planes 312D, 312E, 312F (for example, mirror 330 in plane 312D) can intersect to form a reflective element with its apex positioned below its base. For example, the apex can be located at point P and the base of the reflective element can be located somewhere along the optical axis 321 towards the virtual camera V.

As such, a reflecting reflective element for the wide FOV embodiment 300B is inverted in comparison with a reflecting reflective element for the embodiment 300A. Further, while the array 300A "sees" an image located along optical axis 321, the array 300B "sees" a 180 degree panoramic image of a space located circumferentially around axis 321 but does not see the central image scene that is seen by array 300A. In some embodiments, the designs 300A and 300B can be combined to form a camera that captures a full hemispheric field of view.

In order to design or construct an array camera free of parallax according to the parallax-free design principle illustrated in FIG. 3A, one can locate point V (the center of projection for the virtual camera) anywhere below the horizontal plane 305 of the array camera 300A. The designer or manufacturer can then set or identify the locations of cameras 310A, 310B, 310C and then define lines 313A, 313B, 313C connecting the center of projection of each camera with the center of projection of the virtual camera. Next, the designer or manufacturer can locate the middle 314A, 314B, 314C of each segment 313A, 313B, 313C and place the plane 312A, 312B, 312C of a mirror at the middle or substantially at the middle 314A, 314B, 314C and orthogonal or substantially orthogonal to that segment.

In order to design or construct an array camera free of parallax according to the parallax-free design principle illustrated in FIG. 3B, a designer or manufacturer can locate point V (the center of projection for the virtual camera) anywhere above the horizontal plane 305 of the array camera 300B. The designer or manufacturer can then set or identify the locations of cameras 310D, 310E, 310F and then create lines 313D, 313E, 313F connecting the center of projection of each camera with the center of projection of the virtual camera. Next, the designer or manufacturer can locate the middle 314D, 314E, 314F of each segment 313D, 313E, 313F and place the plane 312D, 312E, 312F of a mirror at the middle 314D, 314E, 314F and orthogonal to that segment. As illustrated in FIG. 3B, a mirror 330 can be placed anywhere in its corresponding plane 312D.

Although each plane 312A-312F is illustrated with a boundary, in theory a plane is infinite, and the designer can choose the appropriate size and location of a mirror within its corresponding plane according to the needs of the particular camera construction, for example to prevent overlapping mirrors, obstruction of a camera's field of view, etc. Reflections from those mirrors send each center of projection (in this case of cameras 310A-310F) to the same virtual canter of projection V of the thin camera 300A, 300B. This ensures no or substantially no parallax in the resulting stitched image between the fields of view of the cameras.

In some embodiments, the mirrors located within planes 312A-312C and 312D-312F can be arranged to form a reflective element. For example, planes 312A-312C can be extended outward from the illustrated boundaries until they intersect to form a reflective element with an apex at or near point P having mirrored facets sloping downward and outward. As another example, planes 312D-312F can be extended outward from the illustrated boundaries until they intersect to form a reflective element with an apex at or near point P having mirrored facets sloping upward and outward. As such, a reflecting reflective element for the embodiment 300B is inverted in comparison with a reflecting reflective element for the embodiment 300A. Accordingly, mirrors do not have to be positioned in the locations shown for planes 312A-312F and the actual mirrors do not have to be located along the lines 313A-313F or containing midpoints 314A-314F, but rather can be located anywhere in the infinitely extended plane.

The examples illustrated in FIGS. 3A and 3B include three cameras, however the parallax-free design principle works for any number of cameras. The exact viewing direction of the individual cameras is not related to the issue of parallax, but is related to efficiency and artifacts of tilt, etc. Such distortions in the images resulting from different viewing direction of cameras can be undone digitally with the well-known projective transform, applied after the fact. This correction is exact for infinitely small apertures and approximately exact for small finite apertures, for example, apertures that may typically be used in imaging systems of mobile device (for example, cell phone, tablets, etc.). Projective transform correction can be remove all or substantially all tilt artifacts by applying an appropriate projective transform (which is actually predefined given the positioning of the mirror plane and the camera).

In some thin camera implementations, all cameras of the array may be positioned in the horizontal plane of (or physically inside the) thin camera module or camera housing. However, in other embodiments the cameras do not have to be positioned in the horizontal plane 305. For example, the cameras do not have to be positioned in the horizontal plane for a spherical camera, or for a free "3D cloud of centers" camera arrangement. In some array camera embodiments, the arrangement of the cameras may be symmetric, or substantially symmetric, so that all mirror planes have one common point of intersection. If such point exists, it is denoted P in the figures, as in FIGS. 3A and 3B. The plurality of mirrors can form a reflective element with apex P. As used herein, the term pyramid or reflective element can refer to any three-dimensional shape having a number of facets each extending upwardly at angle from a base with some or all facets meeting at apex P. In other cases there may be no point common to all mirrors. In the described embodiments, however the design is free (or substantially free) of parallax artifacts because all virtual cameras (the images of real cameras after folding) see the world from a common virtual center of projection V, regardless of orientation. As used herein, the virtual center of projection refers to the center projection of the virtual camera location from which the projected field-of-view (FOV) cones of all of the cameras in the array appear to originate, even after re-directing or folding of the incoming light (for example by mirrors or refractive prisms).

If symmetry is not sufficient, the array camera design, while producing parallax free images, may still show incorrect defocus blur artifacts. A defocus blur kernel can be created, in order to compensate at least partially for the defocus blur, from the common aperture that is synthesized from all camera apertures/mirrors. If there are gaps and irregularities at certain locations or directions in the view from the location of V, blur will appear unnatural. This is due to the fact that real individual cameras are not really points, but apertures each representing an area of a surface with orientation in 3D space. However, designs with insufficient symmetry may still be used for capturing good quality images of scenes that are almost completely in focus, or if there are no objects particularly close to the array camera, for example, from approximately 20 cm to approximately 50 cm from the camera, in some implementations.

Figure 4A:
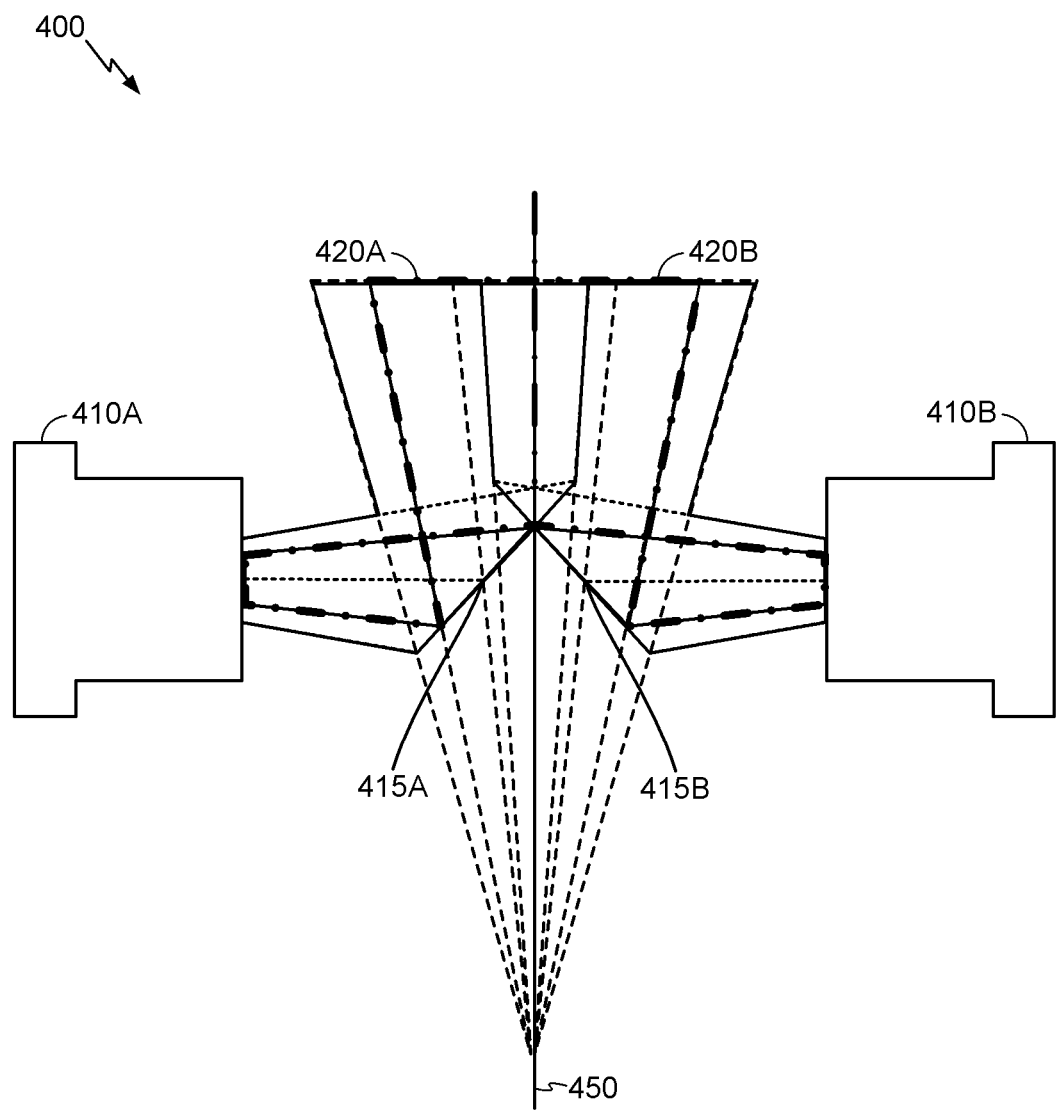
FIGS. 4A through 4C illustrate an embodiment of an array camera free of parallax artifacts.
Figure 4B:
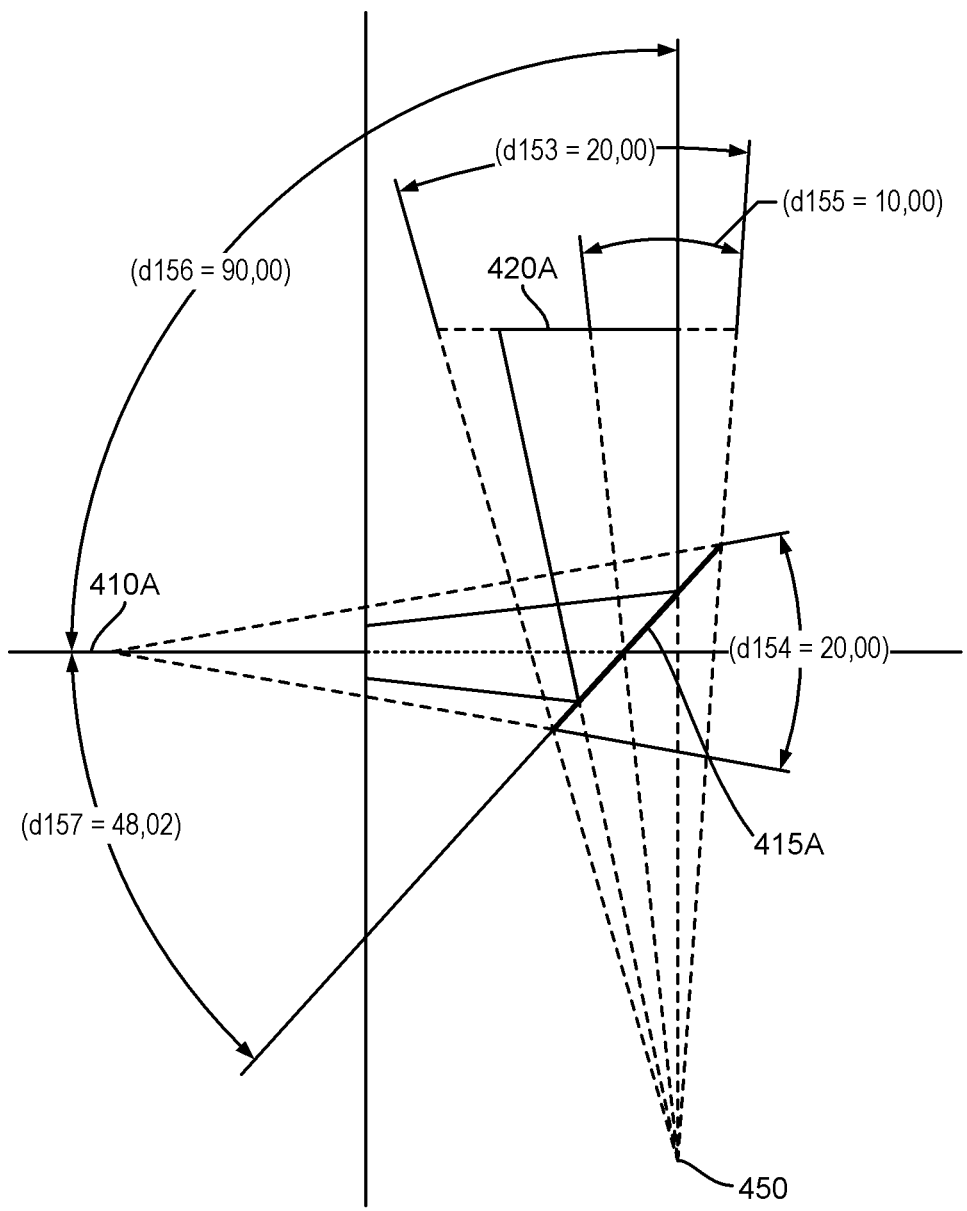
Figure 4C:
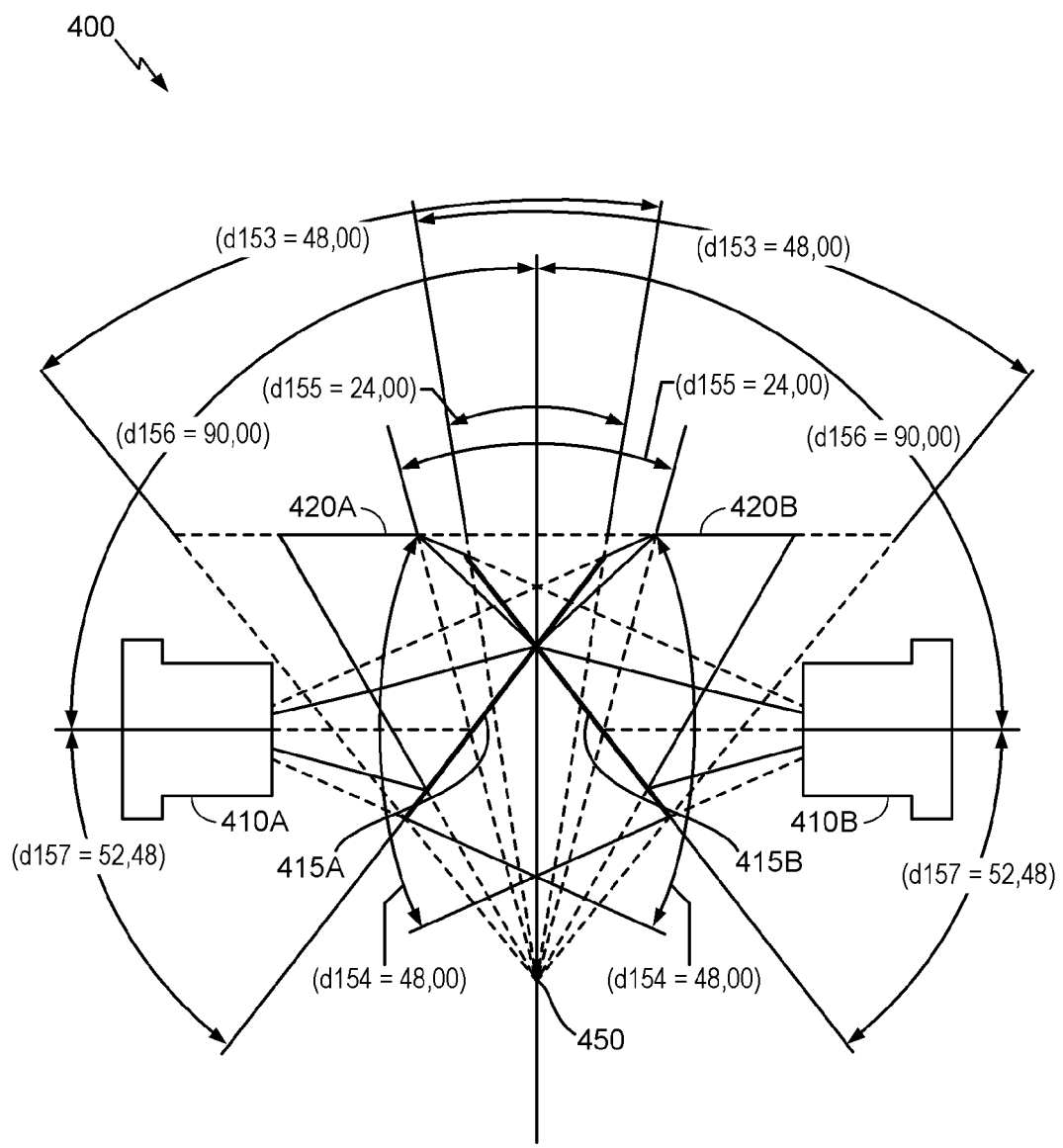

FIGS. 4A through 4C illustrate an embodiment of an array camera 400 designed according to the parallax-free design principle illustrated in FIGS. 3A and 3B. FIG. 4A illustrates an array with two-cameras 410A, 410B. The cameras 410A, 410B each have a viewing angle of approximately 20 degrees, resulting in an effective viewing angle of approximately 26 degrees for the combined array camera 400. The cameras 410A, 410B appear to capture image data from the same apparent origin 450. The view 420A, 420B that is observed by each cameras 410A, 410 is highlighted in blue dashed lines. For purposes of clarity lens assemblies and secondary reflecting or reflecting surfaces are not illustrated in cameras 410A, 410B. In some embodiments, sensors of cameras 410A, 410B may be aligned with light following initial reflection or refraction, however in other embodiments secondary reflective or refractive surface may be used, for example to reduce the overall height of the array by placing the sensors of cameras 410A, 410B within or substantially within a common plane.

FIG. 4B illustrates one example of design parameters for viewing angle 420A and mirror surface 415A for the camera 410A of FIG. 4A. To achieve an effective viewing angle of 60 degrees for the synthetic aperture (the sum of all views of the cameras 410A, 410B in the array 400), the individual cameras 410A, 410B each should have a FOV having a viewing angle 420A, 420B of at least approximately 48 degrees. FIG. 4C illustrates an example of design parameters for both viewing angle 420A, 420B and mirror surfaces 415A, 415B for the cameras 410A, 410B of FIG. 4A to achieve a 60 degree viewing angle.

Figure 5A:
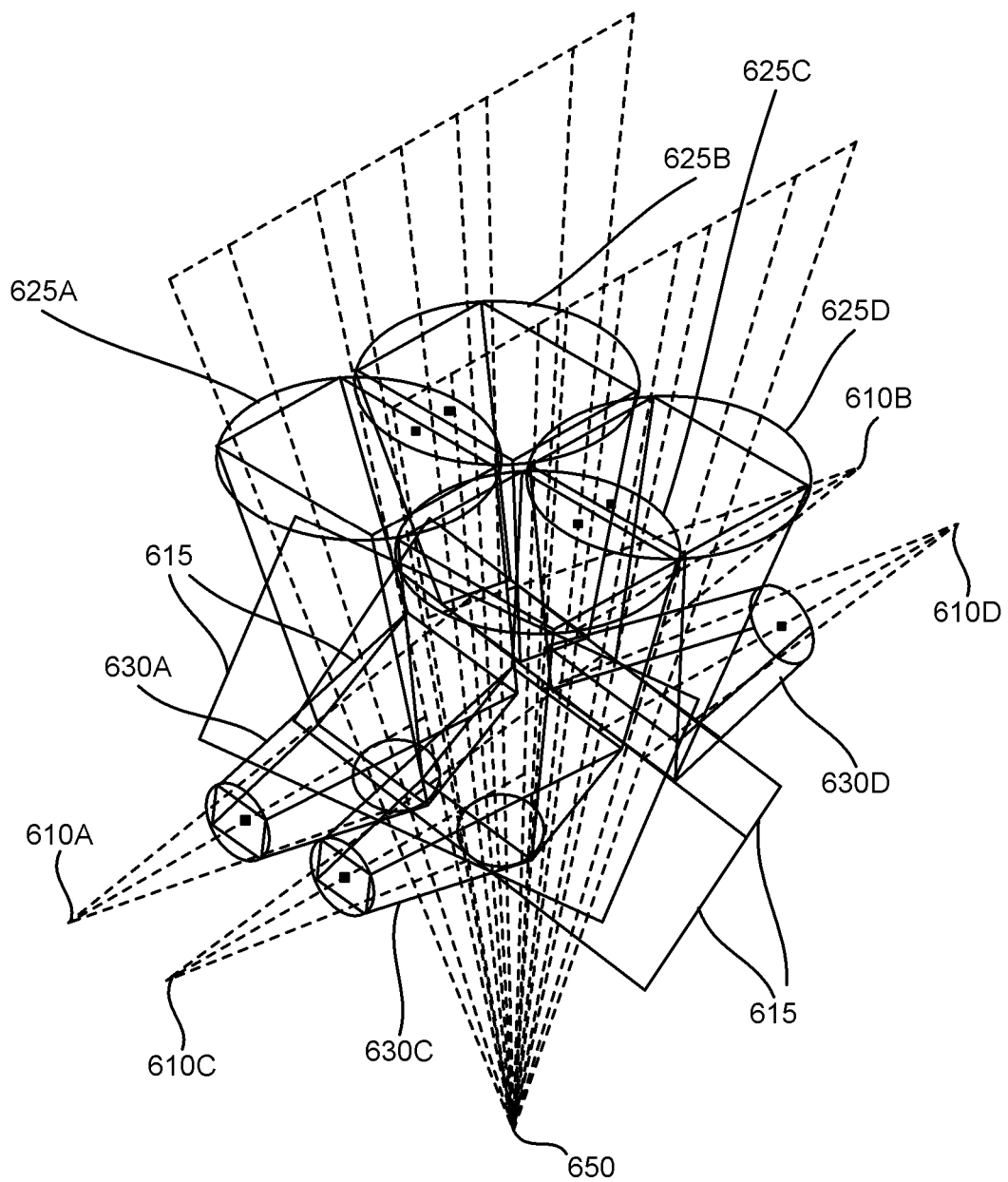
FIG. 5A illustrates an embodiment of an array camera free of parallax artifacts.
Figure 5B:
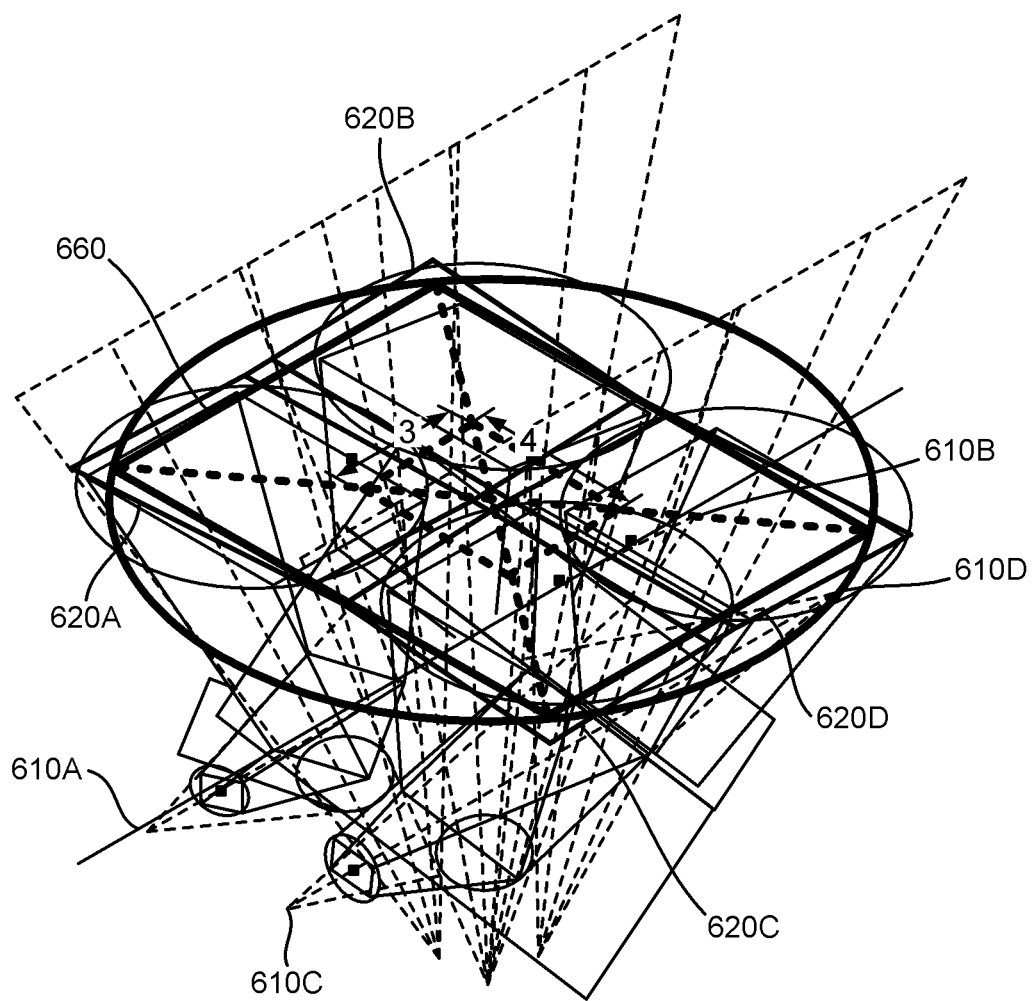
FIG. 5B illustrates an alternate embodiment of the camera of FIG. 5A that is not free of parallax artifacts.

FIGS. 5A and 5B illustrate an embodiment of a four-camera 610A-610D array camera 600 designed according to the parallax-free design principle illustrated in FIGS. 3A and 3B. FIG. 5A illustrates an isometric view of the four-camera 610A-610D array camera 600 created by mirroring of the FOV of a single camera about two planes. For purposes of clarity lens assemblies and secondary reflecting or reflecting surfaces are not illustrated in cameras 610A-610D. In some embodiments, sensors of cameras 610A-610D may be aligned with light following initial reflection or refraction, however in other embodiments secondary reflective or refractive surface may be used, for example to reduce the overall height of the array by placing the sensors of cameras 610A-610D within or substantially within a common plane. Cones 625A-625D are the cones of the FOV as seen by the lens of the cameras 610A-610D. The cones 630A, 630C, 630D (note: cone 630B not illustrated for clarity of the figure) are the cones of the FOV as seen by the sensor of the cameras 610A-610D.

The location of the mirror planes 312D-312F (illustrated in FIG. 3B and generally as mirror plans 615 in FIG. 5B) as specified by the parallax-free design parameters described above with respect to FIGS. 3A and 3B determines in part the shape of the final image and the amount of overlap between images captured by the cameras 610A-610D (the angle of the reflective surface positioned within mirror planes 615 is also a factor).

The location of the mirror planes 312D-312F (illustrated in FIG. 3B and illustrated generally as mirror planes 615 in FIG. 5A) as specified by the parallax-free design parameters described above with respect to FIGS. 3A and 3B determines in part the shape of the final image and the amount of overlap between images captured by the cameras 610A-610D (the angle of the reflective surface positioned within mirror planes 615 is also a factor).

As illustrated, there is overlap between the viewing areas 620A-620D due to skewing of the FOV of each camera 610A-610D. The illustrated four-camera array camera 600 was designed without significant overlap between the FOV of the cameras, however this can be achieved in one embodiment by rotating adjacent cameras about their optical axis, as the optical axes of the cameras reside in the same plane. For the adjacent cameras overlap exists in part due to skewing of the FOV of the cameras. This overlap can be larger than shown and can be skewed, as the overlapping area of the left camera is actually reflected from the mirror surface of the right camera and vice versa.

In some embodiments, overlap can be created between adjacent cameras by rotating them toward the virtual optical axis until they are back in an un-rotated position. However, placing the cameras parallel to each other can cause overlap to increase with increasing object distance while the non-overlapping area will not increase at increasing object distance (the percentage overlap will approach 100%), and therefore may not be a workable solution in certain embodiments. Rotating the cameras slightly toward the centerline to create some overlap can result in an overlap of approximately 10 degrees in each direction. However, depending on the size and relative positioning of each camera as well as the height constraints of the array, there may not be enough space available to place two rotated cameras side by side.

Figure 6:
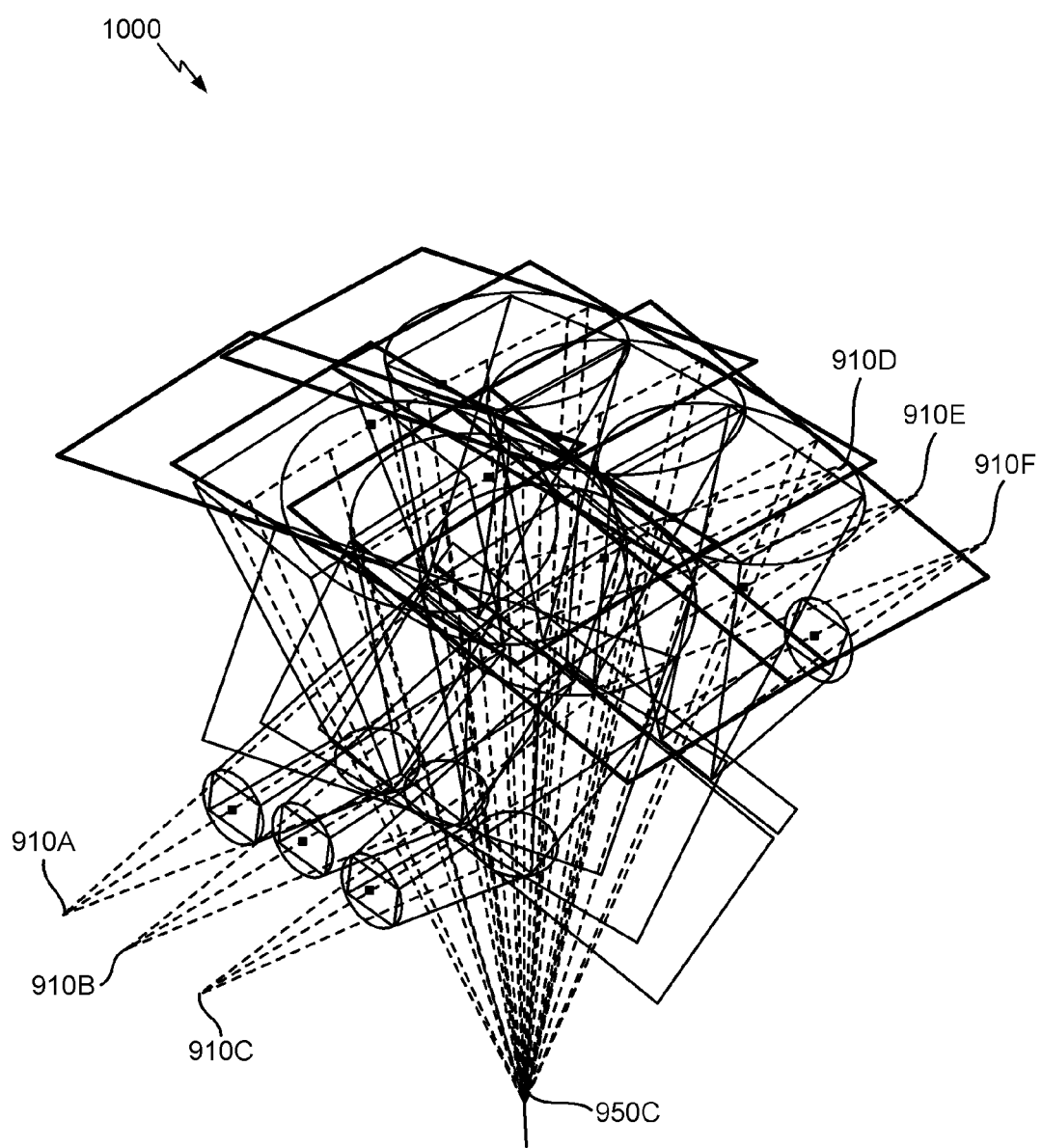
FIG. 6 illustrates an embodiment of a parallax free array camera.

FIG. 6 illustrates an embodiment of an array camera 1000 designed according to the parallax-free design principle illustrated in FIGS. 3A and 3B. The camera of FIG. 6 is a six-camera 910A-910F array camera constructed by extending the four-camera array camera to include an additional two cameras and two mirrored surfaces. The cameras 910A-910F in this embodiment can be rotated due to space constraints.

IV. Overview of Example Image Capture Process

Figure 7:
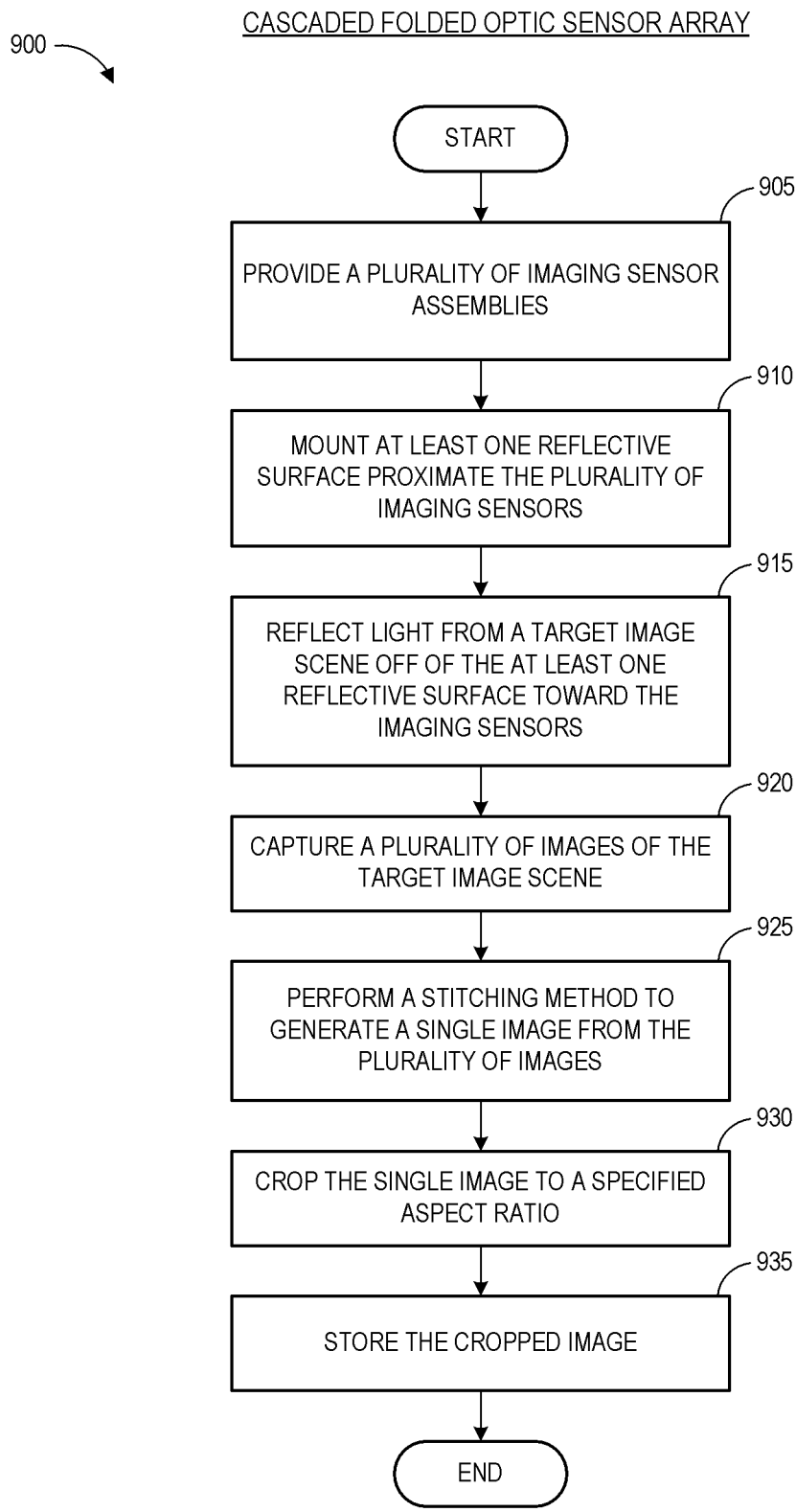
FIG. 7 illustrates an embodiment of a folded optic image capture process.

FIG. 7 illustrates an embodiment of a folded optic image capture process 900. The process 900 begins at block 905, in which a plurality of imaging sensor assemblies are provided. This block includes any of the sensor array configurations discussed above with respect to the previous images, wherein the sensors and associated light folding surfaces are arranged according to the parallax free design concepts disclosed herein. The sensor assemblies may include, as discussed above, a sensor, lens system, and a refractive or reflective surface positioned to redirect light from the lens system onto the sensor. The process 900 then moves to block 910, in which at least one refractive or reflective surface is mounted proximate to the plurality of image sensors. For example, this block could comprise mounting a central mirror reflective element between two rows of sensor arrays, wherein the central mirror reflective element comprises a surface associated with each sensor in the arrays.

The process 900 then transitions to block 915, in which light comprising a target image of a scene is reflected off of the at least one reflective surface toward the imaging sensors. For example, a portion of the light may be refracted by or reflected off of each of a plurality of surfaces toward each of the plurality of sensors. This block may further comprise passing the light through a lens assembly associated with each sensor, and may also include reflecting the light off of a second surface onto a sensor. Block 915 may further comprise focusing the light using the lens assembly or through movement of any of the reflective surfaces.

The process 900 may then move to block 920, in which the sensors capture a plurality of images of the target image scene. For example, each sensor may capture an image of a portion of the scene corresponding to that sensor's field of view. Together, the fields of view of the plurality of sensors cover at least the target image in the object space. Though not illustrated, projective transforms can be applied to some or all of the captured images in order to digitally rotate the optical axis of the camera used to capture the image.

The process 900 then may transition to block 925 in which an image stitching method is performed to generate a single image from the plurality of images. In some embodiments, the image stitching module 240 of FIG. 2 may perform this block. This may include known image stitching techniques. Further, any areas of overlap in the fields of view may generate overlap in the plurality of images, which may be used in aligning the images in the stitching process. For example, block 925 may further include identifying common features in the overlapping area of adjacent images and use the common features to align the images.

Next, the process 900 transitions to block 930 in which the stitched image is cropped to a specified aspect ratio, for example 4:3 or 1:1. Finally, the process ends after storing the cropped image at block 935. For example, the image may be stored in storage 210 of FIG. 2, or may be stored in working memory 205 of FIG. 2 for display as a preview image of the target scene.

V. Implementing Systems and Terminology

Implementations disclosed herein provide systems, methods and apparatus for multiple aperture array cameras free from parallax and tilt artifacts. One skilled in the art will recognize that these embodiments may be implemented in hardware, software, firmware, or any combination thereof.

In some embodiments, the circuits, processes, and systems discussed above may be utilized in a wireless communication device. The wireless communication device may be a kind of electronic device used to wirelessly communicate with other electronic devices. Examples of wireless communication devices include cellular telephones, smart phones, Personal Digital Assistants (PDAs), e-readers, gaming systems, music players, netbooks, wireless modems, laptop computers, tablet devices, etc.

The wireless communication device may include one or more image sensors, two or more image signal processors, a memory including instructions or modules for carrying out the processes discussed above. The device may also have data, a processor loading instructions and/or data from memory, one or more communication interfaces, one or more input devices, one or more output devices such as a display device and a power source/interface. The wireless communication device may additionally include a transmitter and a receiver. The transmitter and receiver may be jointly referred to as a transceiver. The transceiver may be coupled to one or more antennas for transmitting and/or receiving wireless signals.

The wireless communication device may wirelessly connect to another electronic device (e.g., base station). A wireless communication device may alternatively be referred to as a mobile device, a mobile station, a subscriber station, a user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards such as the 3rd Generation Partnership Project (3GPP). Thus, the general term "wireless communication device" may include wireless communication devices described with varying nomenclatures according to industry standards (e.g., access terminal, user equipment (UE), remote terminal, etc.).

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

A transmission (or communication) means may be used to communicate between two devices. For example, if information is made from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of a transmission (or communication) means.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present disclosure. Various modifications to these implementations will be readily apparent to those skilled in the art, and the generic principles defined herein may be applied to other implementations without departing from the spirit or scope of the disclosure. Thus, the present disclosure is not intended to be limited to the implementations shown herein but is to be accorded the widest scope consistent with the principles and novel features disclosed herein.

What is claimed is:

1. A system for capturing an image of a target scene, the system comprising:
    an array of a plurality of cameras positioned to capture image data representing a plurality of portions of the target scene, the array having a virtual center of projection;
    each of the plurality of cameras positioned to capture a portion of the image data representing a different one of the plurality of portions of the target scene, and each of the plurality of cameras comprising
        an image sensor,
        a lens assembly comprising at least one lens, the lens assembly having a center of projection, and
        a first reflective surface positioned to reflect incoming light representing one of the plurality of portions of the target scene toward the lens assembly, the first reflective surface provided in a plane positioned
            at a midpoint along a line connecting the center of projection of the lens assembly and the virtual center of projection, and
            at an angle orthogonal to the line;
    a surface positioned between the array and the target scene, the surface including an aperture positioned to allow light representing the target scene to pass to the first reflective surface of each of the plurality of cameras;
    a processor; and
    a memory storing instructions that configure the processor to generate the image of the target scene based at least partly on the image data comprising each of the plurality of portions of the target scene;
    wherein the image sensor of each of the plurality of cameras is positioned within a common plane.

2. The system of claim 1, each of the plurality of cameras further comprising a second reflective surface positioned to reflect light received from the lens assembly onto the image sensor, wherein the lens assembly is positioned between the first and second reflective surfaces.

3. The system of claim 1, further comprising a substrate having the image sensor of each of the plurality of cameras mounted to the substrate.

4. The system of claim 3, wherein the surface comprises the substrate, each of the plurality of cameras comprising a refractive prism comprising the first reflective surface and an input surface, the input surface of the refractive prism positioned in the aperture.

5. The system of claim 3, further comprising a central reflective element mounted to the substrate in the path of light representing the target scene passing through the aperture of the surface, the central reflective element having a plurality of facets configured to split the light representing the target scene into the plurality of portions, the first reflective surface of each of the plurality of cameras forming one of the plurality of facets.

6. The system of claim 5, wherein the central reflective element comprises an apex formed by an intersection of each of the first reflective surfaces, and wherein an optical axis of each of the plurality of cameras passes through the apex.

7. The system of claim 6, wherein the array has a virtual optical axis, and wherein the apex and the virtual center of projection are located on the virtual optical axis.

8. The system of claim 1, further comprising a camera housing comprising:
the surface having the aperture as an upper surface thereof; and
a lower surface positioned substantially parallel to the upper surface.

9. The system of claim 8, wherein each of the plurality of cameras is positioned between the upper surface and the lower surface.

10. The system of claim 1, wherein the instructions stored in the memory further configure the processor to perform a projective transform on the image data based at least partly on a geometric relationship between the virtual center of projection and the center of projection of the lens assembly of each of the plurality of cameras and the location of the mirror for each of the plurality of cameras within a corresponding mirror plane.

11. An apparatus for capturing an image of a target scene, the apparatus comprising:
an array of a plurality of cameras having a virtual center of projection, the array positioned to capture image data representing a plurality of portions of the target scene;
each of the plurality of cameras positioned to capture a portion of the image data representing a different one of the plurality of portions of the target scene, each of the plurality of cameras comprising
image sensing means for generating the image data in response to received light,
means for focusing light, the means for focusing having a center of projection, and
first light folding means positioned to redirect incoming light representing one of the plurality of portions of the target scene toward the means for focusing, the first light folding means provided in a plane positioned
at a midpoint along a line connecting the center of projection of the means for focusing and the virtual center of projection, and
at an angle orthogonal to the line;
housing means positioned between the array and the target scene, the housing means including an aperture positioned to allow light representing the target scene to be received by the first light folding means of each of the plurality of cameras; and
means for mounting the image sensing means of each of the plurality of cameras within a common plane.

12. The apparatus of claim 11, each of the plurality of cameras further comprising second light folding means positioned to redirect light received from the means for focusing onto the image sensing means, wherein the lens assembly is positioned between the first and second reflective surfaces.

13. The apparatus of claim 12, further comprising means for moving at least one of the first and second light folding means to change a focal length between the means for focusing and the image sensing means.

14. The apparatus of claim 11, further comprising means for combining the image data representing the plurality of portions of the target scene into the image.

15. The apparatus of claim 11, further comprising means for moving the means for focusing to change a focal length between the means for focusing and the image sensing means.

16. The apparatus of claim 11, further comprising means for adjusting the focus of each of the plurality of cameras together, the means for adjusting positioned between the first light folding means of each of the plurality of cameras and the target scene.

17. A method of capturing an image of a target scene such that the image is substantially free of parallax and tilt artifacts, comprising:
receiving light representing the target scene through an aperture to a plurality of mirrors;
splitting the light representing the target scene into a plurality of portions using the plurality of mirrors;
capturing image data representing the plurality of portions of the target scene by a corresponding plurality of cameras, each of the plurality of cameras positioned to capture a portion of the image data representing a different one of the plurality of portions from a location of a virtual camera having a virtual center of projection, each of the plurality of cameras comprising
a mirror of the plurality of mirrors,
a lens assembly comprising at least one lens, the lens assembly positioned to receive light representing one of the plurality of portions from the mirror,
a center of projection of the lens assembly, and
a sensor positioned to receive the light from the lens assembly,
wherein the mirror is provided in a plane positioned
at a midpoint along a line connecting the center of projection of the lens assembly and the virtual center of projection, and
at an angle orthogonal to the line; and
assembling the image data representing the plurality of portions of the target scene into the image.

18. The method of claim 17, further comprising applying projective transform to the image data representing the plurality of portions of the target scene to change an effective tilt of each of the plurality of cameras.

19. The method of claim 17, further comprising, for each of the plurality of cameras, redirecting the light received from the lens assembly onto the image sensor using a secondary light re-directing surface.

20. The method of claim 17, wherein assembling image data representing the plurality of portions of the target scene into the image comprises stitching portions of the image data representing each of the plurality of portions into a single image and cropping the single image to a specified aspect ratio.

* * * * *